United States Patent [19]

Kabata et al.

[11] Patent Number: 4,999,263
[45] Date of Patent: Mar. 12, 1991

[54] SHEET-SHAPED ELECTRODE, METHOD OR PRODUCING THE SAME, AND SECONDARY BATTERY

[75] Inventors: Toshiyuki Kabata, Yokohama; Toshiyuki Ohsawa, Kawasaki; Sachiko Yoneyama, Yokohama; Okitoshi Kimura, Tokyo, all of Japan

[73] Assignee: Ricoh Company, Ltd., Tokyo, Japan

[21] Appl. No.: 290,411

[22] PCT Filed: Apr. 14, 1988

[86] PCT No.: PCT/JP88/00373
§ 371 Date: Dec. 15, 1988
§ 102(e) Date: Dec. 15, 1988

[87] PCT Pub. No.: WO88/08210
PCT Pub. Date: Oct. 20, 1988

[30] Foreign Application Priority Data

Apr. 15, 1987 [JP] Japan .................. 62-92791
Jul. 6, 1987 [JP] Japan .................. 62-168280
Jul. 9, 1987 [JP] Japan .................. 62-169689
Oct. 2, 1987 [JP] Japan .................. 62-248093
Nov. 11, 1987 [JP] Japan .................. 62-283095

[51] Int. Cl.$^5$ .................. H01M 4/60; H01M 4/70
[52] U.S. Cl. .................. 429/131; 29/623.1; 429/213
[58] Field of Search .............. 429/212, 213, 191, 241, 429/94, 131, 136; 29/623.3, 623.1

[56] References Cited

U.S. PATENT DOCUMENTS

| | | | |
|---|---|---|---|
| 3,350,239 | 10/1967 | Stanimirovitch | 29/623.3 |
| 3,530,001 | 9/1970 | Harivel | 429/94 |
| 4,189,533 | 2/1980 | Sugalski | 429/241 |
| 4,717,634 | 1/1988 | Daifuku et al. | 429/194 |
| 4,731,311 | 3/1988 | Suzuki et al. | 429/213 |
| 4,824,745 | 4/1989 | Ogawa et al. | 429/213 |
| 4,879,192 | 11/1989 | Nishimura et al. | 429/213 |

Primary Examiner—Donald L. Walton
Attorney, Agent, or Firm—Oblon, Spivak, McClelland, Maier & Neustadt

[57] ABSTRACT

A sheet-shaped electrode comprising a polymeric active material (1) and a collector (2) having a plurality of penetrating pores (3), a method of producing the same, and a secondary battery containing the sheet-shaped electrode as a positive electrode. The plurality of the pores provided on the sheet-shaped collector enlarges the contact area between the collector and the polymeric active material, so that close contact between these two members is improved. A polyaniline layer which is prepared by electrochemical polymerization of an aniline type compound in the presence of sulfuric acid or sulfonic acids is applied on both faces of the collector (aluminum) as the polymeric active material. In a secondary battery which comprises the sheet-shaped electrode as a positive electrode, the positive and a negative electrodes are alternately folded with a separator interposed therebetween. Terminals for both electrodes of the collector are arranged at the opposite end portions of the positive electrode and the negative electrode, respectively.

9 Claims, 12 Drawing Sheets

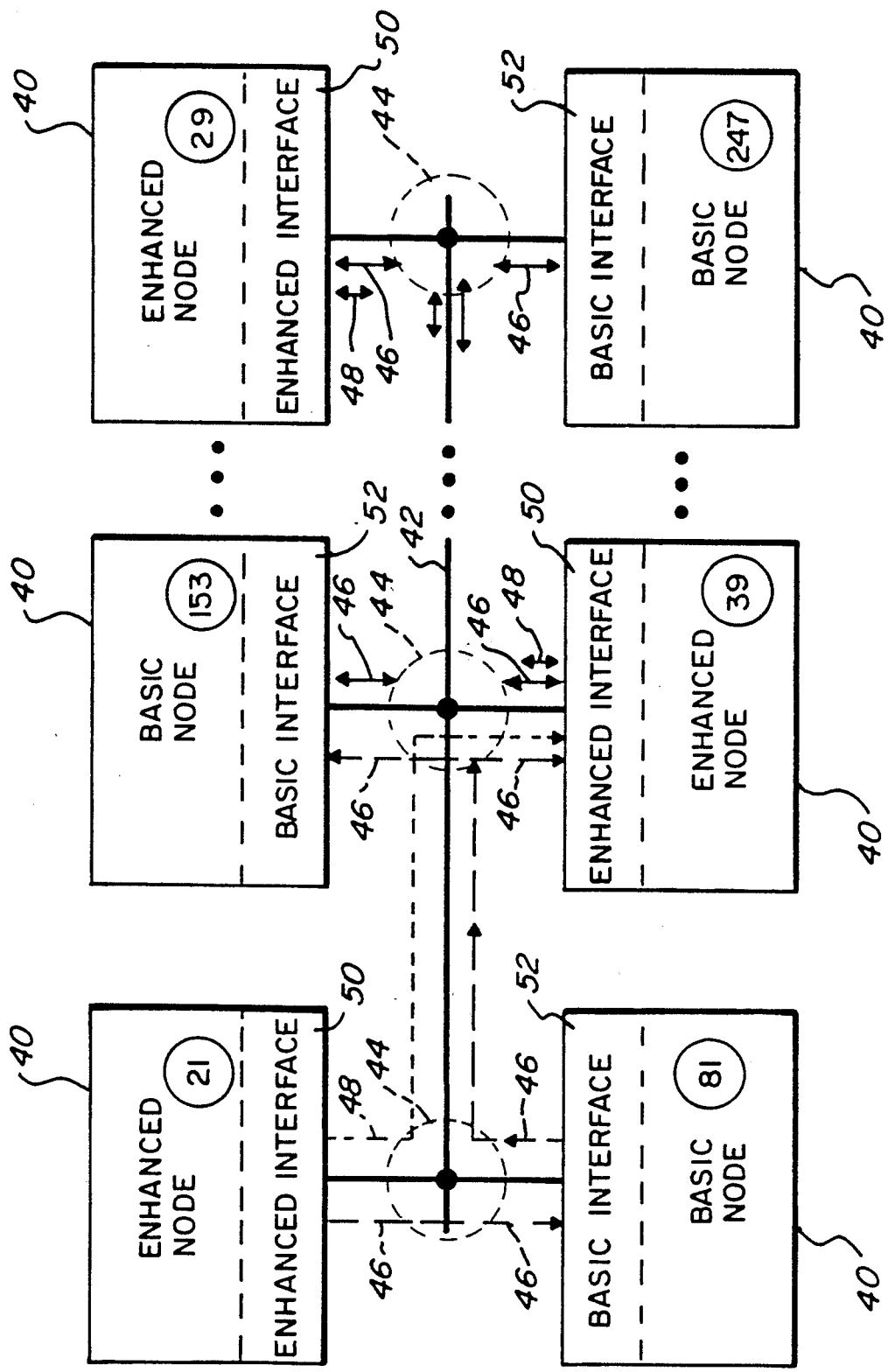
Fig_1

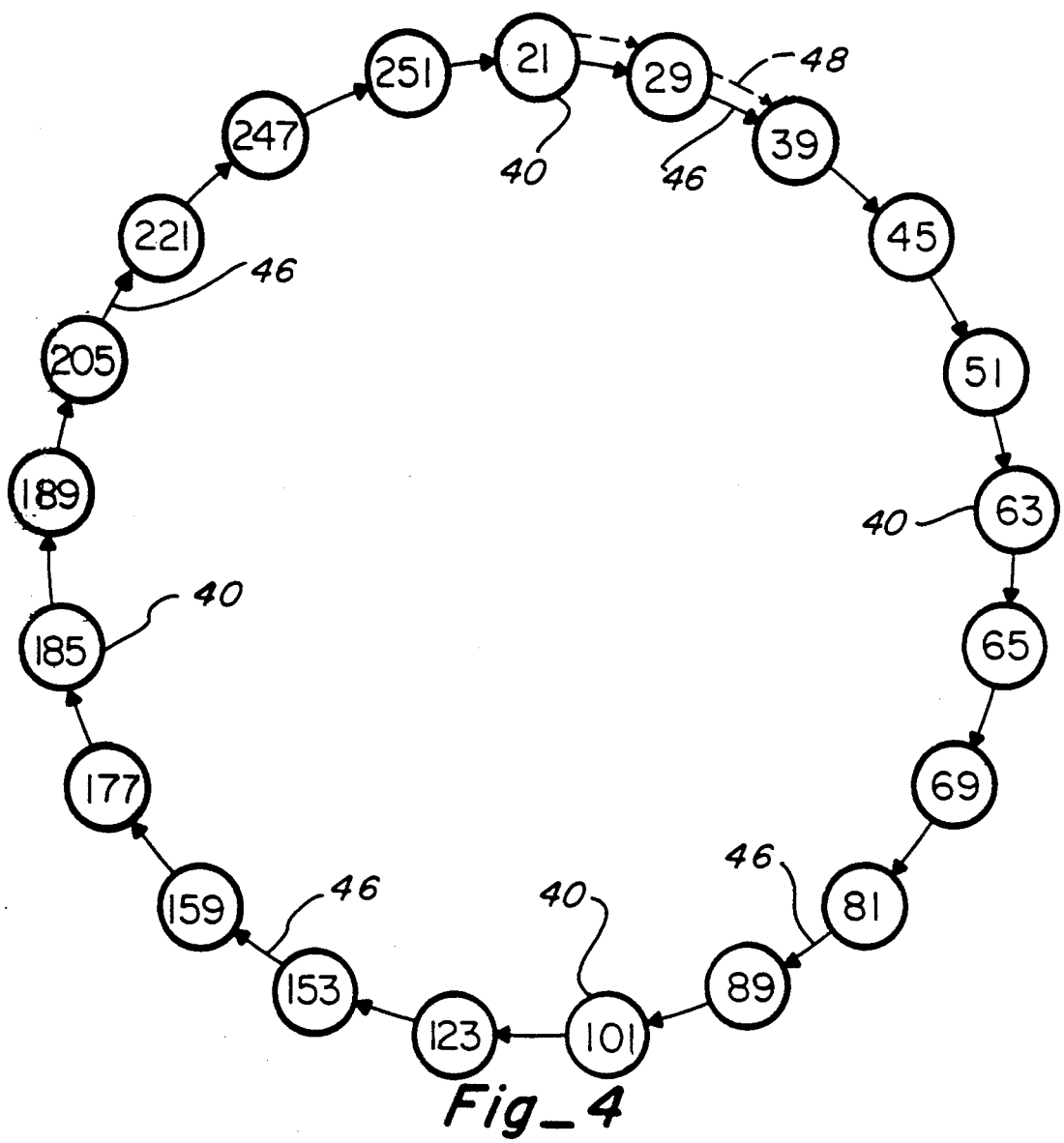
Fig_4
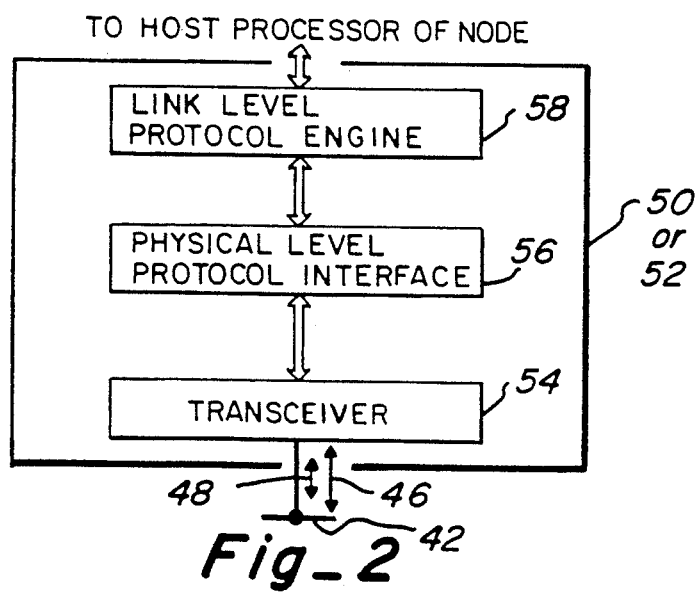
Fig_2

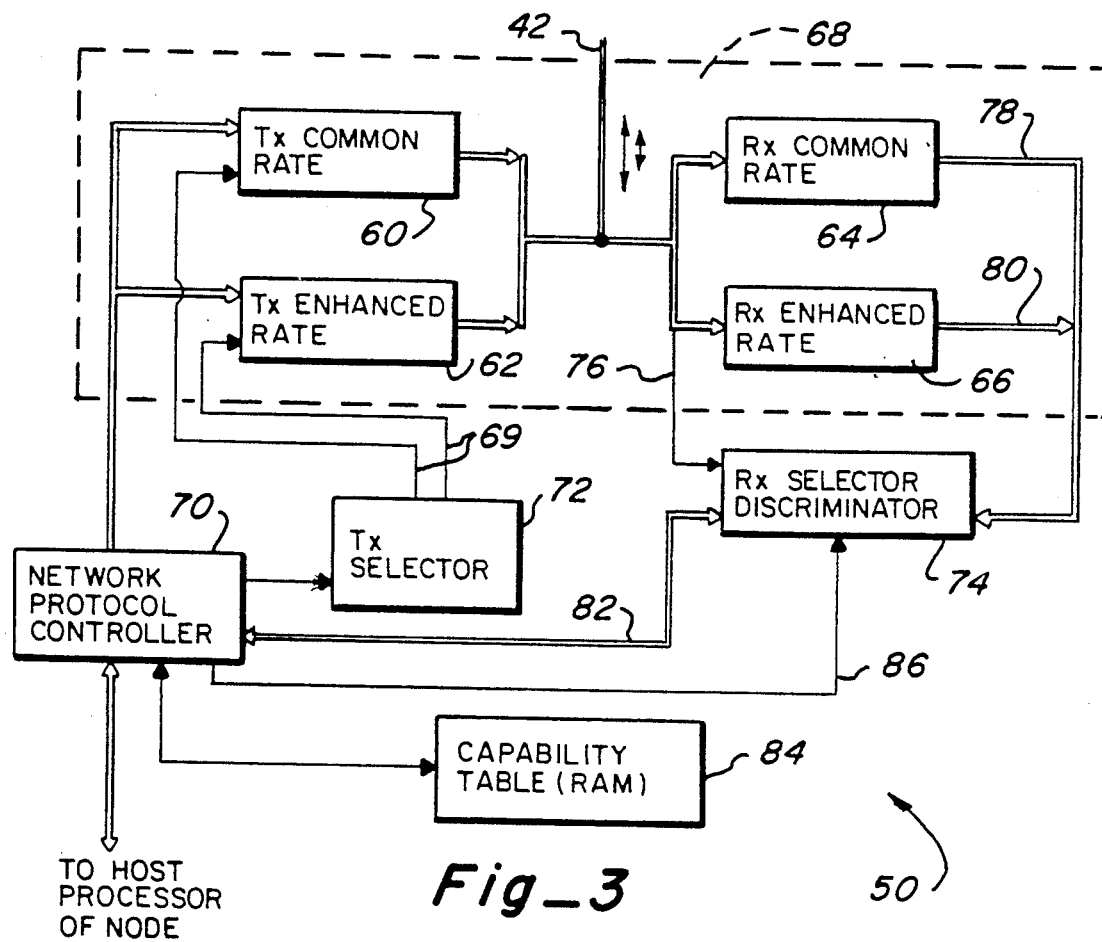
Fig_3

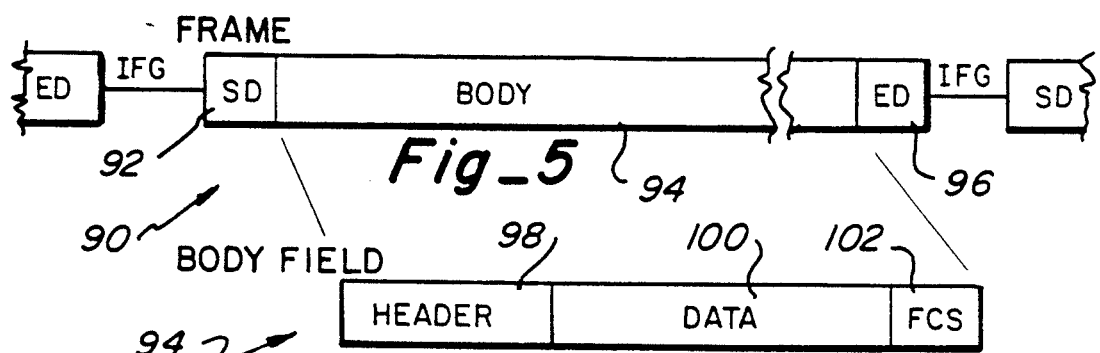
Fig_5
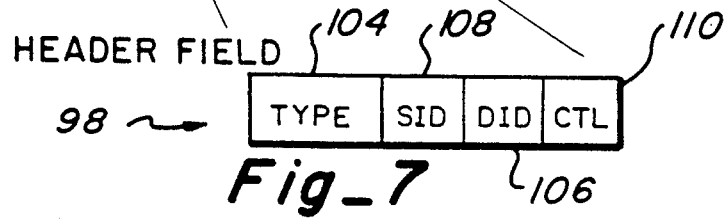
Fig_6
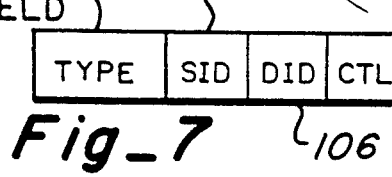
Fig_7
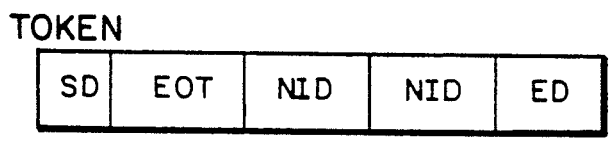
Fig_11
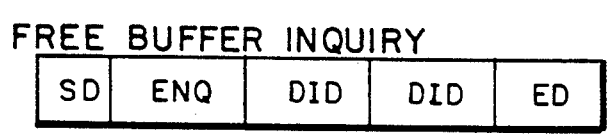
Fig_12
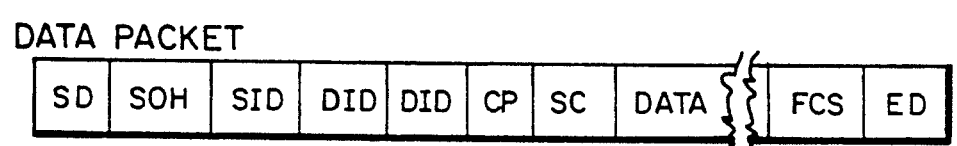
Fig_13
Fig_14
Fig_15

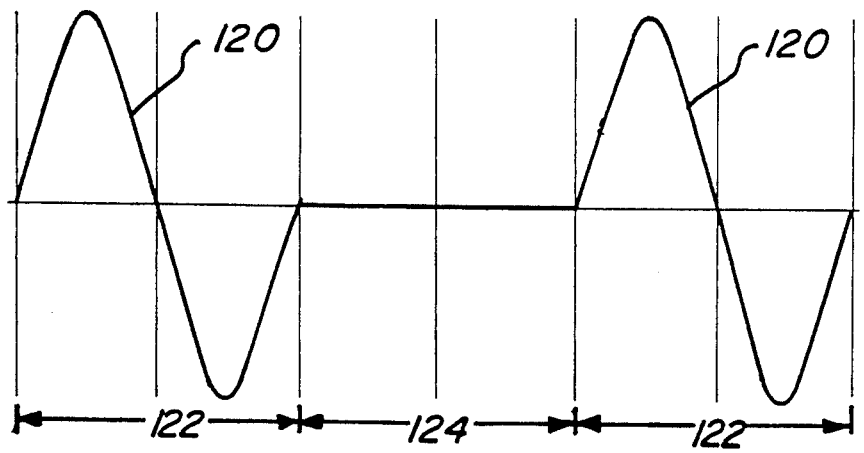
Fig_8
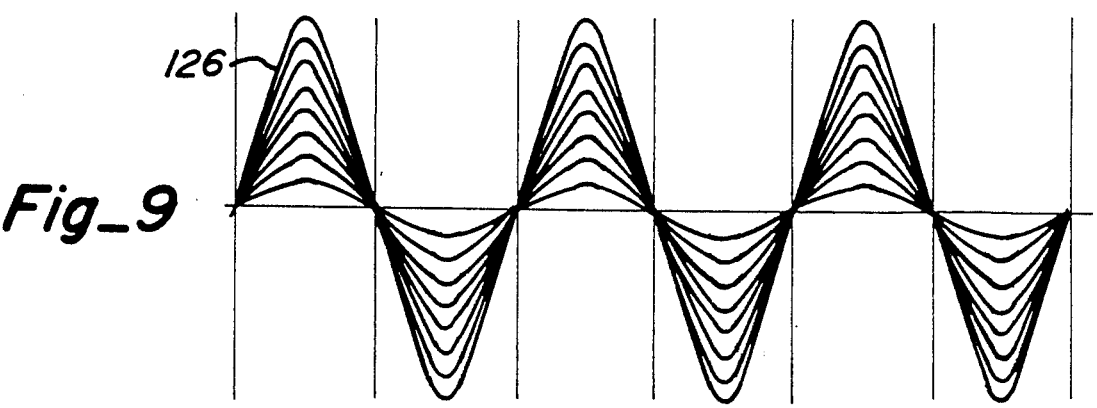
Fig_9
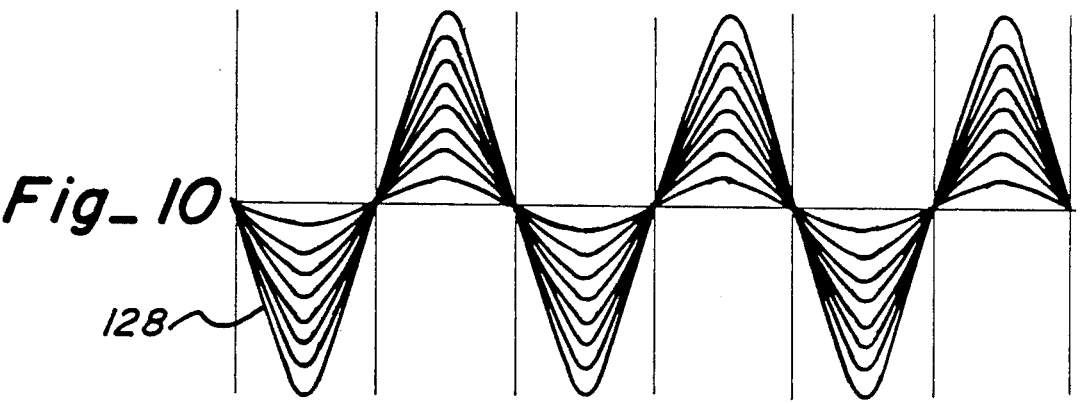
Fig_10

TOKEN TO BASIC NODE (XITT)

| FS: FF: FZ: FZ: FZ: FZ | EOT | NID | NID | ED |

*Fig_16*

TOKEN TO ENHANCED NODE (XTOK)

| XSD | Y | XNID | XNID | ED |

*Fig_17*

INQUIRY TO ENHANCED NODE (XENQ)

| XSD | 9 | XDID | XDID | CTL | CTL | ED |

*Fig_18*

RESPONSE TO ENHANCED NODE (XRSP)

| XSD | D | STAT | STAT | ED |

*Fig_19*

DATA PACKET TO ENHANCED NODE (XPAC)

| XSD | F | XSID | XDID | LNG | SC | XCSU | DATA | FCS | ED |

*Fig_20*

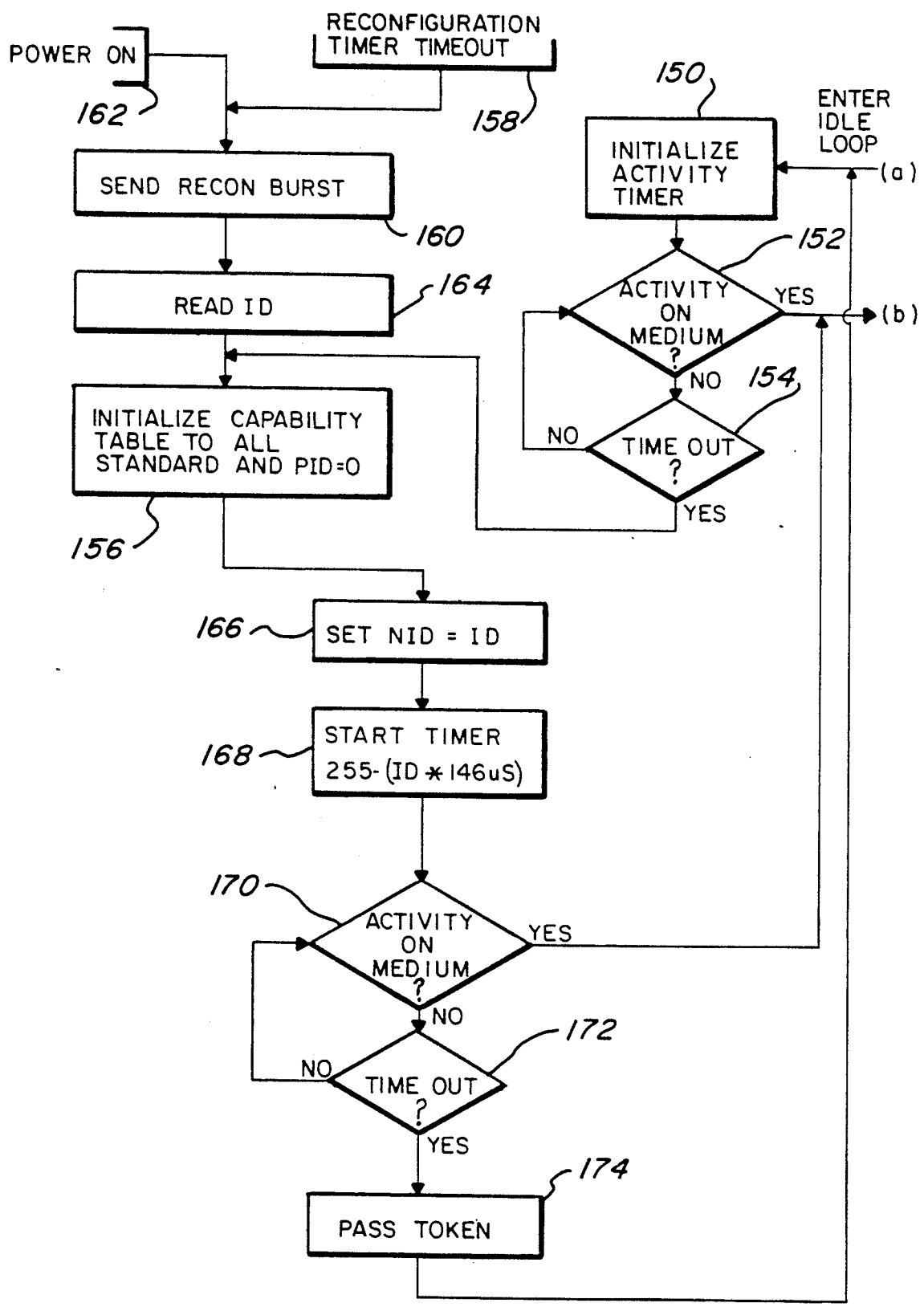
Fig_21A

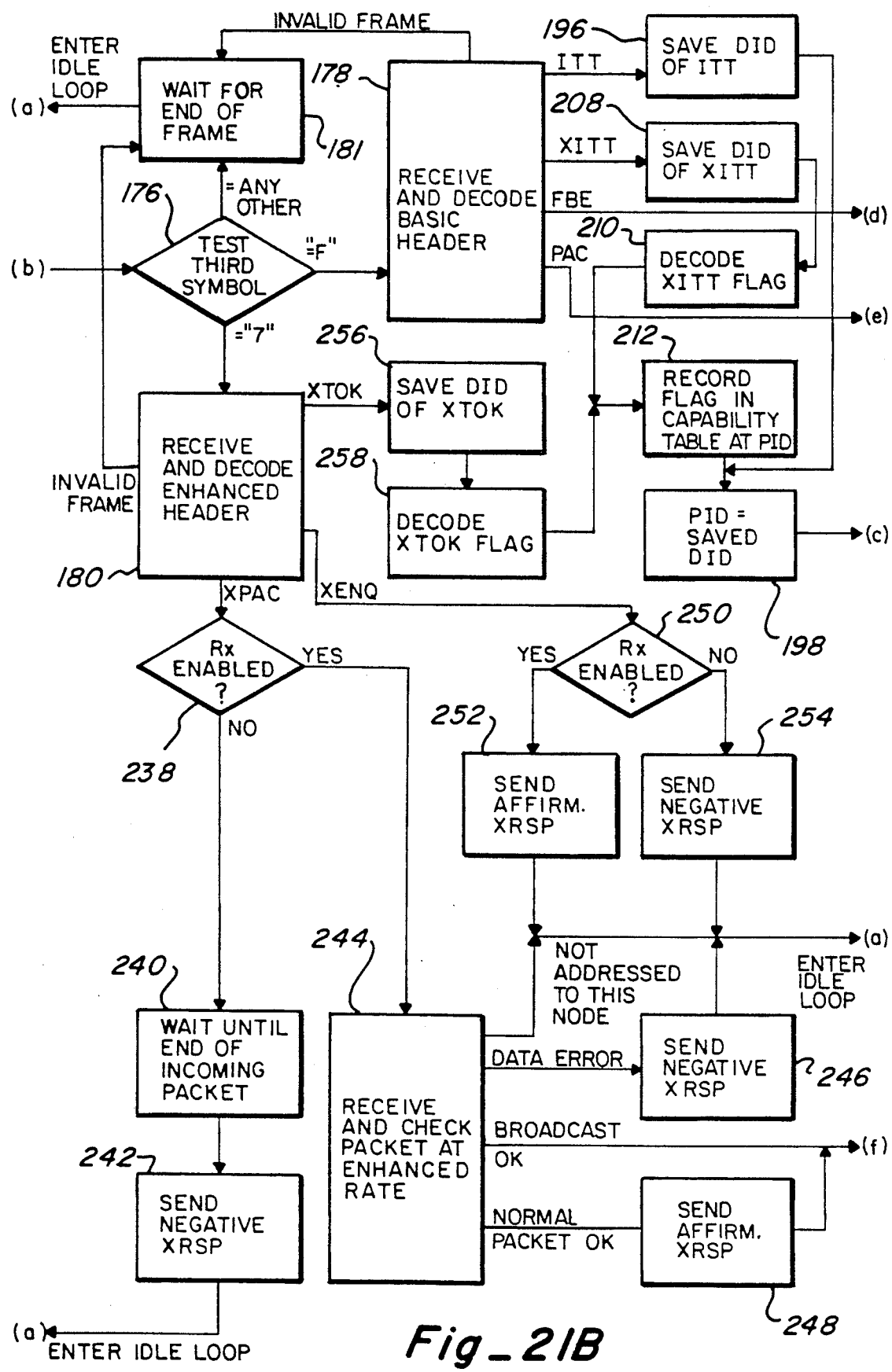
Fig_21B

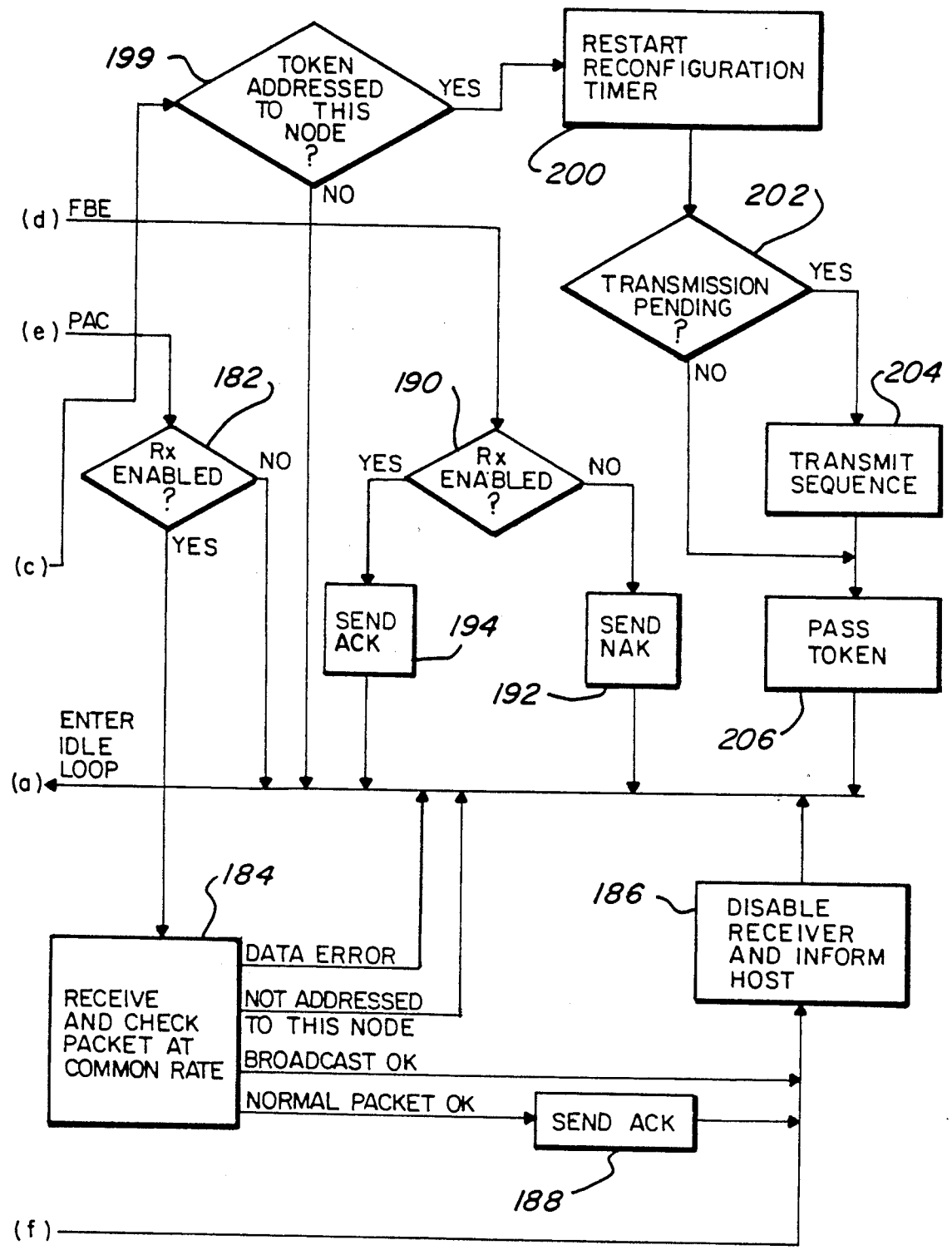
Fig_21C

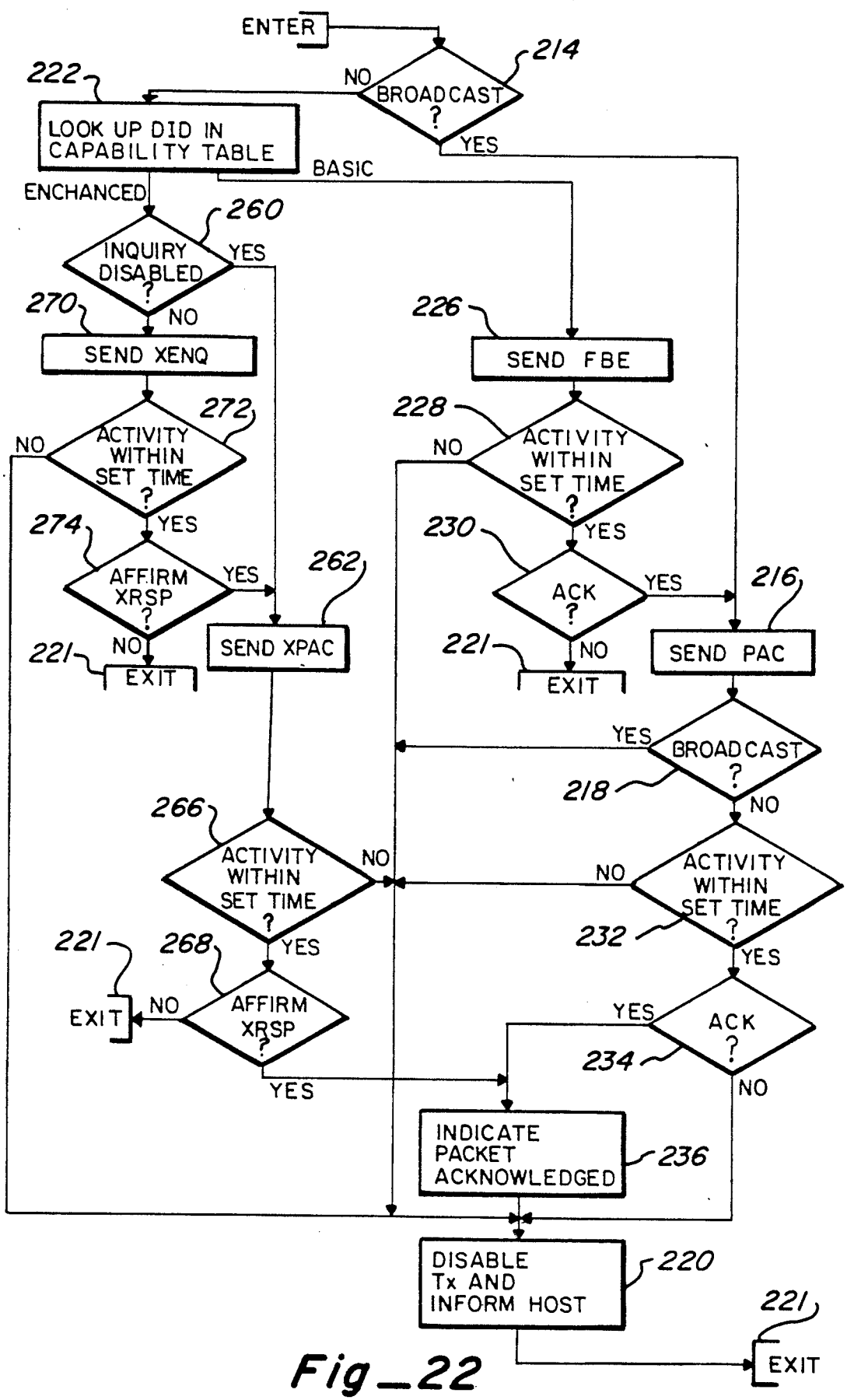
Fig_22

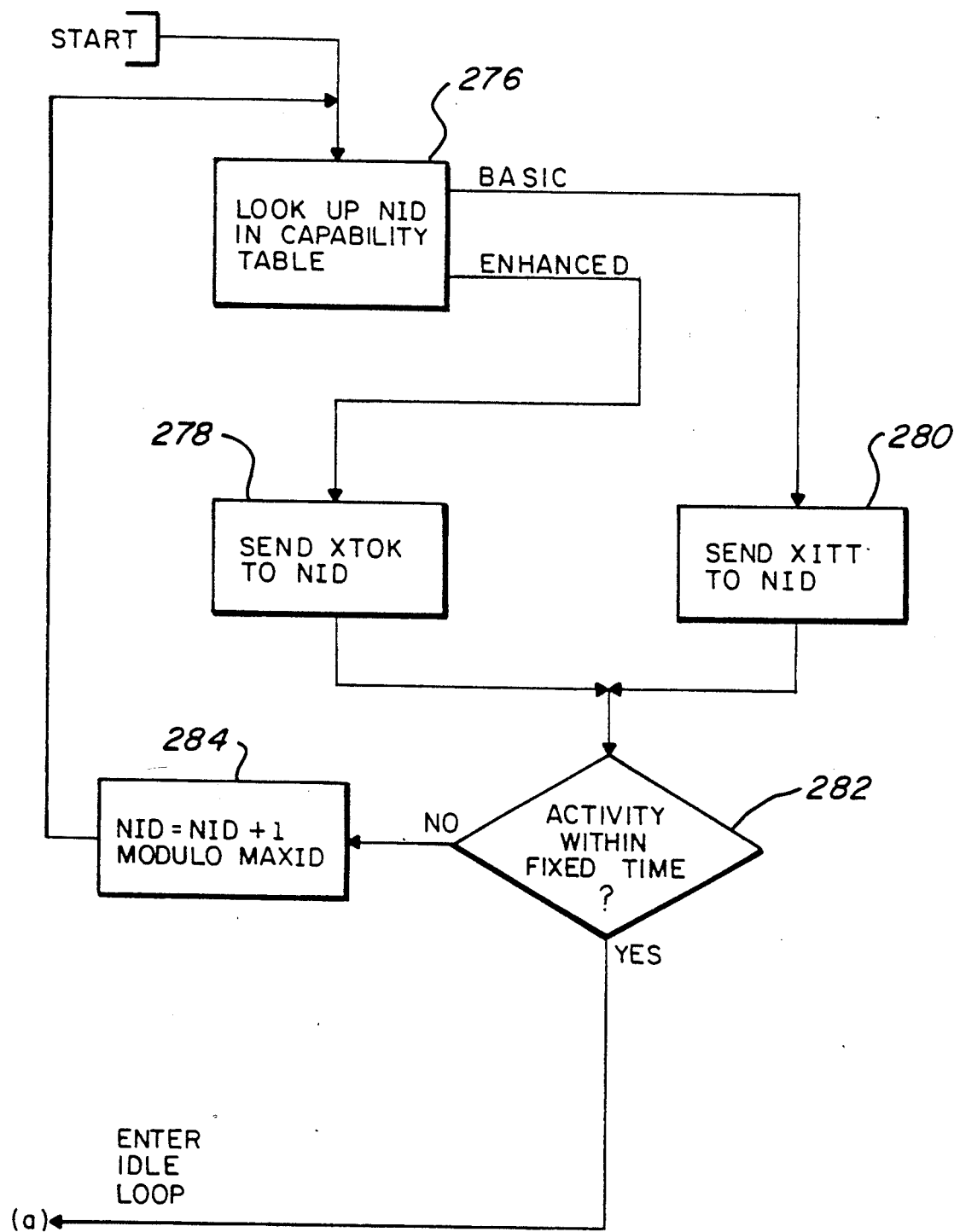
Fig_23

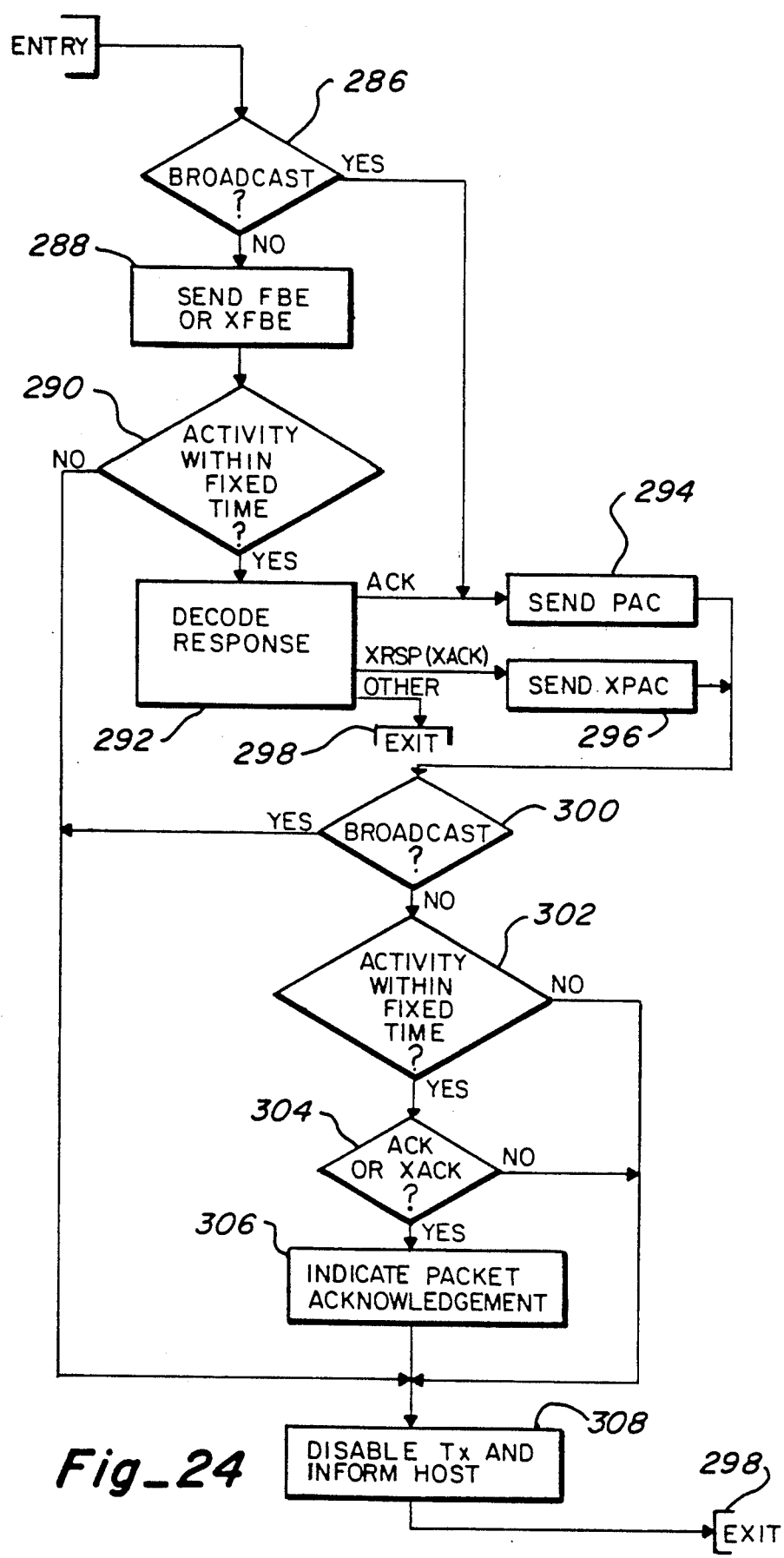
Fig_24

SHEET-SHAPED ELECTRODE, METHOD OR PRODUCING THE SAME, AND SECONDARY BATTERY

FIELD OF THE INVENTION

This invention relates to a sheet-shaped electrode comprising a polymeric material as an active material, and to a secondary battery.

BACKGROUND OF THE INVENTION

Electroconductive polymeric materials such as polyacetylene, polypyrrole, and polyaniline are lighter in weight as compared with metals. In addition, they reveal high electroconductivity when anions or cations are doped, and they are thus electrochemically active. Taking advantage of such properties, they are now applied to electrochromic elements, various sensors, electrodes of batteries and the like.

However, when these electroconductive polymeric materials are employed for the above-mentioned electrodes, it is difficult to perform charge collection from these electroconductive polymeric materials. It may be possible to provide to these electroconductive polymeric materials with the function of a collector. However, it is more desirable to use the polymeric materials in combination with a collector for using the polymeric materials as electrodes, when the improvement of internal impedance and reliability of the electrodes is taken into consideration.

Polymeric active materials have an advantage in that they can readily be worked into a sheet. Therefore, it is desirable that a collector to be used in combination with the polymeric materials also be in the shape of a sheet.

Particularly, when the polymeric active materials are employed as an electrode of a battery, it is preferable to use a light and non-bulky collector in view of the energy density.

In the case of the above-mentioned structure, the close contact of the electrode active material and the collector is important to improve the charge collection efficiency. For this reason, various studies have been made of collectors for use in organic secondary batteries.

For instance, Japanese Laid-Open Patent Applications 58-115776 and 58-115777 disclose methods for achieving close contact between collectors and polymeric active materials. However, the polymeric active materials are poor in film-forming property and mechanical strength, so that the collector and the polymeric active material cannot be closely contacted with each other, and the active materials readily peel and fall off the collector during repeated charging and discharging. Consequently, the electrodes provided with such collectors and polymeric active materials have poor collecting efficiency and a short cycle life. Further, Japanese Laid-Open Patent Applications 62-20243 and 61-133557 disclose that electroconductive polymers can be subjected to electrochemical polymerization by employing a collector made of an expanded metal, wire netting or the like as an electrode. However, when a collector made of an expanded metal is used, it is hard to fully utilize the morphological characteristics of the conductive polymers, and the control of their morphology is also difficult. This is because it is considered that the morphology of each conductive polymer is determined by the diameter and the shape of the wire-like material. In addition, the above two-dimensional mesh-like metals are difficult to work into a thin sheet, especially into a sheet having a thickness of 50 μm or less, so that they are not suitable for use as a collector of a sheet-shaped electrode for a thin battery. Furthermore, the electroconductive polymer characteristically grows around each wire material of the two-dimensional mesh-like structure, and it is difficult to cause the polymer to grow inside the lattices of the mesh-like structure. Even if the polymer grows inside the lattices, the polymer formed on the wire materials has a considerable thickness, so that an electrode having a uniform thickness is not obtainable.

It is therefore an object of the present invention to provide a composite sheet-shaped electrode comprising a collector and a polymeric material, with the collector and the polymeric material being very closely contacted with each other, which is light in weight and has high energy density and mechanical strength. Another object of the present invention is to provide a battery which is light in weight and has high energy density. A further object of the present invention is to provide a novel method of preparing a film of polymeric active material on a collector, thereby providing a method of producing a sheet-shaped electrode.

The inventors of the present invention have made earnest studies in order to solve the above described problems resided in the prior art. As a result, it was discovered that the problems can be solved by forming penetrating pores in a collector of a sheet-shaped electrode which is covered with a polymeric active material. The present invention has been accomplished based on the above discovery.

Further, the improvement in both the performance and the reliability of a battery has been achieved by using the above sheet-shaped electrode in the battery by use of a polymeric solid electrolyte in combination therewith, or by mounting the electrode in a specific manner. The present inventors have realized that the sheet-shaped electrode is usable in the various fields. For instance, when it is used as an electrode of a battery, the resulting battery shows high capacity and reliability. Particularly, a sheet-shaped thin type battery having the excellent properties has been successfully fabricated by using the sheet-shaped electrode together with a polymeric solid electrolyte or by mounting the sheet-shaped electrode in a specific manner.

DISCLOSURE OF THE INVENTION

The present invention discloses a sheet-shaped electrode comprising a polymeric active material and a collector, which is characterized in that the collector is in the shape of a sheet and has a plurality of penetrating pores and/or a rough surface all over the surface thereof; a secondary battery whose positive electrode is the above-described sheet-shaped electrode; a secondary battery employing the above sheet-shaped electrode as a positive electrode, having a structure in which the positive electrode, a separator and a negative electrode are in the shape of a sheet, with the positive electrode and the negative electrode being alternately folded through the separator, characterized in that as the positive electrode is employed the above sheet-shaped electrode in which a layer of the polymeric active material is formed on both surfaces of the collector; a secondary battery which comprises a positive electrode, a solid electrolyte, and a negative electrode, characterized in that the above sheet-shaped electrode is employed as the positive electrode; and a method of preparing a sheet-shaped electrode in which a collector is made of aluminum and a polymeric active material is a polyaniline material, characterized in that an aniline compound is electrochemically polymerized in the presence of sulfuric acid or sulfonic acids.

The electrode of the present invention is characterized in that a plurality of penetrating pores are formed in a collector covered with a polymeric active material. Because of the formation of these penetrating pores, the polymeric active material applied to the collector can be firmly contacted with the collector through the penetrating pores. Thus, the polymeric active material and the collector are electrically well connected, so that the entire active material can be used effectively. Further, since these pores substantially enlarge the contacting area between the collector and the active material, the internal resistance can be decreased, and short circuit current density can be increased in the battery. In addition, since the pores can retain the active material therein, the energy capacity can also be increased.

In the present invention, as the collector, a sheet-shaped electroconductive materials are used. The term "electroconductive" normally means that the property having an electric conductivity of $10^{-2}$ Scm$^{-1}$ or more, and the term "sheet-shaped" means thin and flat. As the sheet-shaped electroconductive materials, such sheet-shaped electroconductive materials as having a thickness of from 3 to 150 $\mu$m, preferably from 5 to 100 $\mu$m, and more preferably from 10 to 80 $\mu$m, and an area of 2 cm$^2$ or more, preferably 10 cm$^2$ or more, are recommended. However, the above mentioned thickness and area can be changed, depending on the purpose of the application. Therefore, the thickness and area are not limited to the above-mentioned thickness and area. In the case where the electroconductive material is thinner than 3 $\mu$m, a collector with sufficient mechanical strength cannot be obtained because of the penetrating pores. On the other hand, when the thickness exceeds 150 $\mu$m, the advantage of the light weight is lost when a maximum amount an amount of the active material that is deposited on the inner surfaces of the pores, and the resulting electrode thus become heavier. Further, the self-returning flexibility at the time of bending of the collector and excellent close contact between the collector and the active material due to the formation of the pores cannot be obtained. The structures of such collectors using the electroconductive sheet-shaped material are a sheet-shaped electroconductive material itself; a composite material in which the electroconductive material is overlaid on a substrate; and a composite material in which a polymeric electroconductive material is overlaid on a substrate.

The following sheet-shaped conductive materials are usable as the collector without being combined with any other materials: a metal sheet of Ni, Pt, Au, Al and the like, a alloy sheet of stainless steel and the like, a conductive polymer film having high conductivity and high mechanical strength, such as polypyrrole, and an electroconductive sheet which is prepared by homogeneously mixing carbon fibers or a carbon powder with resins, followed by working the mixture into a sheet.

Examples of the composite materials in which the sheet-shaped electroconductive material is overlaid on a substrate include electroconductive films which are prepared by performing vacuum evaporation or application of a metal such as Au, Pt, Ni and Al, a metal oxide such as SnO$_2$ and In$_2$O$_3$, ITO and a carbon material onto a plastic film having penetrating pores; and conductive films which are prepared by coating polypyrrole on a plastic film such as polyester film by means of oxidation polymerization. Examples of the composites in which the sheet-shaped electroconductive polymer material is applied to a metal base include a composite material which is prepared by coating polypyrrole on a metal base such as an aluminum base having penetrating pores by oxidation polymerization.

Considering the application of the collector to a positive electrode of a battery, it is preferable to select the above described materials in a combination so that the oxidation-reduction potential of an active material for a positive electrode is higher than that of the collector.

Particularly, Ni and Al are suitably employed as the materials for the collector, which never impair the properties of the polymeric active materials. Of these, aluminum is more preferable in order to prepare a collector which is light in weight.

The shape of each penetrating pore of the collector may be a polygon such as a triangle and a square, a circle, an ellipse, a free shape made by combining any one of the above-mentioned shapes, and an indeterminate form. Ideally, it is preferable that the pores be penetrated vertically through the collector, and have a uniform size. However, pores which are penetrated at an angle of 45° or less are also acceptable depending on the conditions for the preparation of a film of the polymeric active material.

Further, when the polymeric active material is electrochemically prepared on the collector, it is preferable that the pores be penetrated in such a shape that electric field would not be concentrated, that is, a rounded shape having no edges or angles. The diameter of the penetrating pores is from about 0.5 to 1000 $\mu$m, preferably from about 1 to 500 $\mu$m, and more preferably from about 1 to 200 $\mu$m. In the case where the diameter of the penetrating pores is less than 0.5 $\mu$m, a sufficient strength cannot be obtained in the polymeric active material. On the contrary, when the diameter of the pores exceeds 1000 $\mu$m, it is difficult to completely fill the pores with the electroconductive polymer.

The total surface area of the penetrating pores is from about 1 to 70%, preferably from about 5 to 30%, and more preferably from about 10 to 27%, based on the total surface area of the collector. When the total surface area of the pores is less than 1%, the polymeric active material and the collector cannot be firmly contacted with each other, and in the case of more than 70%, the strength of the collector itself tends to become weak.

Regarding the arrangement of the penetrating pores, any arrangements are acceptable, as long as the pores are arranged uniformly. The arrangement may be regular such as lattice-like and zigzags, and at random.

The above described penetrating pores can be obtained by a mechanical working method, for example, by punching a foil of the collector; a chemical or electrochemical etching method applied to a metal sheet; galvanoplastics, that is, galvanizing a metal on an electrode having inert parts which correspond to the penetrating pores of the collector. Of these, galvanoplastics is preferable because the penetrating pores and the sheet-shaped collector can be prepared at the same time.

It is preferable that the collector having the penetrating pores further possess a rough surface. The rough surface may have non-penetrated micro-unevenness, and this unevenness is desirably in such a shape that the electric field is not concentrated upon electrochemical reaction for preparing a polymeric material on the collector. Namely, preferable unevenness is such that it is uniform in the direction of the surface, which has preferably an undulation with a repeated cycle of 100 μm or less, in a rounded shape. In order to make such a rough surface, a mechanical abrasion using an emery paper, an abrasion material and an abrasion apparatus, or electrochemical abrasion such as ion spattering and electrostatic etching may be employed. It may also be processed into a fiber-like or nonwooven cloth-like surface.

Of these, the blast method and the electrostatic etching method are more preferable, because these methods are easy to conduct and highly reliable. It is preferable to conduct this etching in the atmosphere of an inert gas. The polymeric active material covers not only the penetrating pores, but also the rough surface, so that the contact area between the collector and the polymeric active material become larger compared with the case where the collector has only penetrating pores without having a rough surface. As a result, the collecting efficiency is remarkably improved. Further, the polymeric active material and the collector are closely contacted with each other, so that a battery which has a prolonged cycle life and high reliability can be obtained.

No particular order is placed for processing the penetrating pores and the rough surface. In the case where a composite of a base material and a conductive material or a metal covered with a conductive polymer material is used as a collector, the base may be provided with penetrating pores and roughened in advance. Thereafter, the conductive material is formed on the base by vacuum evaporation, application or electrochemical polymerization.

The polymeric materials used as an active material in the present invention are required to have electrocunductivity to some degree. Examples of such conductive polymeric materials include polymers of acetylene, pyrrole, thiophen, aniline, benzene, diphenylbenzidine, diphenylamine, triphenylamine, azlene, and the derivatives thereof. These polymers exhibit high electroconductivity when they are doped with some impurities, and at the same time, they can store energy. If the polymeric materials are used for a battery, the range of their electroconductivity is $10^{-5}$ S/cm$^2$ or more, preferably $10^{-3}$ S/cm$^2$ or more, in a doped state. The polymeric material having an electroconductivity of less than $10^{-5}$ S/cm$^2$ is not suitable for an electrode of a battery because the internal impedance of such material is unfavorably increased.

The thickness of the electroconductive polymeric material depends on their starting material. However, the aimed effect is obtainable when the material has a thickness of 1000 μm or less.

The preferable weight of the polymeric material is at most two times of the weight of the collector. If the weight of the polymeric material is beyond this range, the collector does not work adequately. Consequently, it is required to add other collecting material into the active polymer material.

The polymeric active materials may be prepared in accordance with a chemical polymerization method, an electrochemical polymerization method and the like. When a thermal decomposition polymerization is employed, a prepolymer is coated on the surface of a collector and then heated to polymerize the prepolymer. Thus, a collector with further improved contact with the polymeric material can be obtained.

Especially, in the course of electrochemical polymerization, a film of a polymeric material is formed on the surface of an electrolytic electrode. Therefore, if a collector is used as an electrolytic electrode, the electrode aimed for is simultaneously obtainable with formation of an active material. With respect to electrochemical polymerization, details will be given later.

In the electrochemical polymerization, the electroconductive polymer grows, at an initial stage, almost uniformly on the inner surfaces of the penetrating pores of the collector, and then gradually grows up to fill the pores. Finally, it completely fills the pores, and is combined with a polymer which has grown on the surface of the collector.

Various other objects, features and attendant advantages of the present invention will be more fully appreciated as the same becomes better understood from the following detailed description when considered in connection with the accompanying drawings in which like references characters designate like or corresponding parts throughout the several views and wherein:

THE BEST MODE FOR CARRYING OUT THE INVENTION

Figure 1:
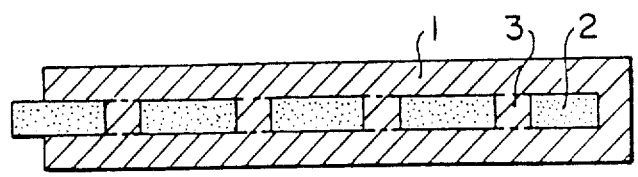
FIG. 1 is a diagram of a layered structure of a sheet-shaped electrode.

FIG. 1 is a diagram in explanation of the layered structure of a sheet-shaped electrode of the present invention which is prepared by integrally combining a collector and a conductive polymer. In the figure, reference numeral 1 indicates the polymeric active material and reference numeral 2 indicates the collector having penetrating pores 3. As described before, the pores are preferably penetrated in a round shape so as to avoid the concentration of the electric field when conducting an electrochemical reaction.

The collector of the present invention having the penetrating pores is flat sheet-shaped, so that the morphology of the electroconductive polymeric material can be controlled by changing the conditions for the polymerization.

Thus, a conductive film can be uniformly formed on the both sides of the collector with an almost equal thickness. In the case where the film grows insufficiently on one side of the collector, electrochemical polymerization can be conducted again to form a uniform film on both sides of the collector.

As will be mentioned later, however, the electrode of the present invention does not necessarily need a film of the conductive polymer on both sides of the collector. Even a collector whose one side is covered with the conductive polymer is acceptable as long as it is suitably used.

The thus obtained collector and the electroconductive polymeric material are closely contacted with each other, and the polymeric material is hardly peeled off the collector.

Further, when both sides of the collector are covered with the electroconductive polymer, since the collector and the polymeric material are integrally combined with each other, the electric potentials of both sides of the electrode become equal.

The electrode of the present invention can find wide industrial applications. For instance, it can be used as a secondary battery, an electrochromic element, a switching element, a sensor, an element for a photoelectric transducer, a memory element, and the like.

The followings are the detailed explanation of a secondary battery containing the electrode of the present invention.

The secondary battery comprises the electrode of the present invention at least as a positive electrode thereof. A polymeric active material of this electrode stores energy when it is doped with anions or cations, and it discharges the energy through an outer circuit when dedoped. Namely, doping and dedoping reversibly take place in the electrode of the present invention, so that the electrode is suitably used as a secondary battery.

The battery basically contains a positive electrode, a negative electrode and an electrolytic solution consisting of a solvent and an electrolyte. The battery can further contain, between the two electrodes, a separator which is impregnated with the electrolytic solution.

It is also possible to use a solid electrolyte, particularly a polymeric solid electrolyte which will be described later, instead of the electrolytic solution and the separator. The technique using the polymeric solid electrolyte is novel, and it is applicable to a battery which does not contain, as an electrode, a collector having penetrating pores.

The structure of the secondary battery containing the electrode of the present invention will now be explained.

Various structures are acceptable as final structure. However, a battery in which a positive and a negative electrode face each other with a separator being interposed therebetween is preferred.

Two types of the electrodes are embodied in the present invention. Namely, as described before, one electrode contains a polymeric active material only on one side of a sheet-shaped collector having penetrating pores, and the other contains a polymeric active material on both sides of a sheet-shaped collector having penetrating pores. Particularly, the latter electrode can be used widely, because the polymeric active material on both sides of the electrode works as active material.

A first application example is a thin type battery characterized in that an electrode made of a sheet-shaped collector having both sides thereof covered with a polymeric active material is at least used as a positive electrode, and the positive electrode and a negative electrode are alternately crossed and folded, and each electrode terminal is oppositely provided at each edge of the electrodes. A battery whose electrodes are folded is novel, and can be applied not only to a battery with a collector having penetrating pores, but also to a battery whose collector has no penetrating pores. However, it is needless to say that the performance of the former one is better than that of the latter one.

Figure 2:
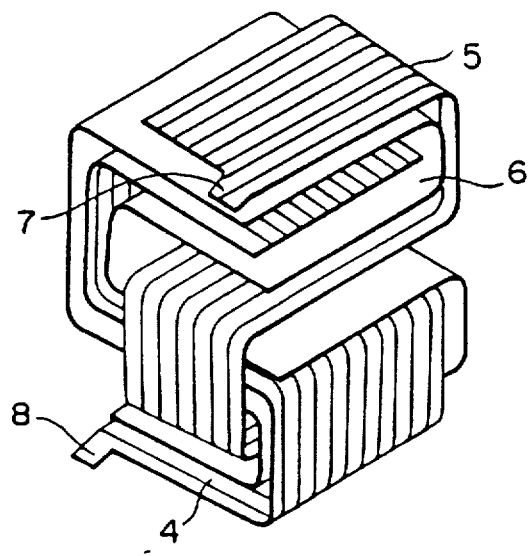
FIG. 2 is a perspective view of the layered structure of an example of a thin type battery according to the present invention.
Figure 3:
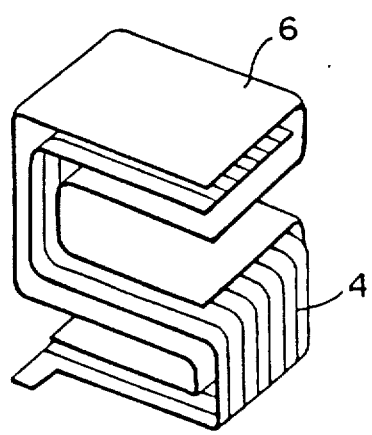
FIG. 3 is a diagram of a positive electrode and a separator.
Figure 4:
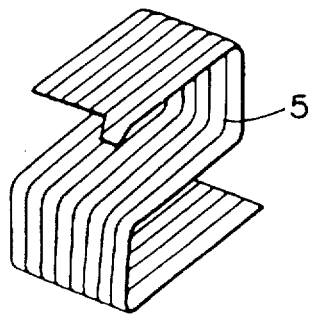
FIG. 4 is a diagram of a negative electrode portion.
Figure 5:
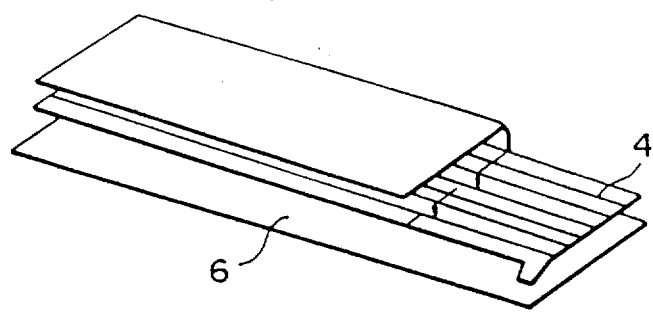
FIG. 5 is a diagram of a positive electrode covered by a separator before folded.
Figure 6:
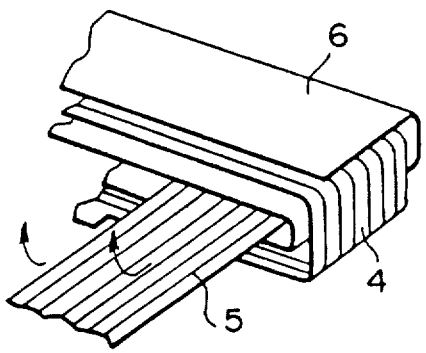
FIGS. 6 and 7 are diagrams of the step in the course of folding the positive electrode covered with the separator and the negative electrode.
Figure 7:
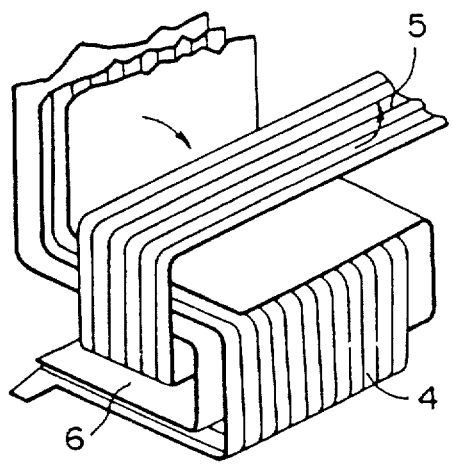
Figure 8:
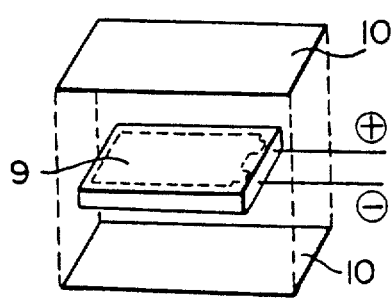
FIG. 8 is a diagram of the entire structure of a battery.
Figure 9:
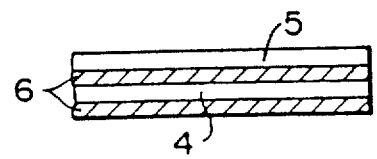
FIG. 9 is a diagram of a laminated sheet for use in a spiral cylinder type battery shown in FIG. 10.

FIGS. 2 to 8 are diagrams in explanation of the structure of a thin type battery of the present invention in which a sheet-shaped electrode is folded in folds. FIG. 2 is a perspective view of the layered structure of the thin type battery. FIG. 3 is a perspective view of a positive electrode and a separator. FIG. 4 is a perspective view of a positive electrode. FIGS. 5 to 7 are diagrams showing the steps of laminating and folding the sheet-shaped electrode. FIG. 8 is a schematic illustration of the whole structure of a battery containing the above electrode.

In these figures, reference numeral 4 indicates a sheet-shaped positive electrode; reference numeral 5, a sheet-shaped negative electrode; reference numeral 6, a sheet-shaped separator; reference numeral 7, a negative electrode terminal; reference numeral 8, a positive electrode terminal; reference numeral 9, a laminated layer; and reference numeral 10, an outer core. The portions indicated with reference numerals 2 and 3 will be explained in detail later.

In this battery, the sheet-shaped electrode of the present invention in which the polymeric active material is provided to both sides of the collector is used as a positive electrode. So long as the above electrode is employed as a positive electrode, even an electrode whose both sides are covered with a polymeric active material can be used as a negative electrode.

A method of folding the electrode shown in FIG. 2 will now be explained. In this method, a positive electrode covered with a separator and a negative electrode are alternately folded and laminated. The folding order may be reversed. This method will be explained in more detail with reference to the accompanying drawings.

FIGS. 6 to 8 show the steps of folding the electrodes to laminate. As shown in FIG. 6, both sides of a sheet-shaped positive electrode 4 are covered with a separator 6, remaining one edge of one side of the positive electrode being uncovered with the separator 6. This uncovered portion is an edge portion when the positive electrode is folded, and its area may be adjusted as the case may be. It is to be noted that a lateral side of the positive electrode is not necessarily covered with the separator 6.

The thus obtained positive electrode covered with the separator 6 and the sheet-shaped negative electrode 5 are superposed at right angles with each other, as shown in FIGS. 7 and 8, and are folded alternately. When the positive electrode and the negative electrode are folded in accordance with the above manner, the first portion of the positive electrode 4, which is not covered with the separator 6, is made to come to the lowermost end, and the last uppermost end portion is an electrode opposite to the lowermost end portion, which is a negative electrode in this case.

It is preferable to pick up the electrode terminals of the collector oppositely from each end portion of the positive electrode and the negative electrode. The battery thus charges and discharges uniformly in its entirety.

If the electrode terminals of the collector are picked up from the edges of the same side of the positive and the negative electrodes, charging and discharging are induced only in the vicinity of the terminals, so that the life of the battery becomes short.

The separator 6 is impregnated with an electrolytic solution which is prepared by dissolving an electrolyte in a solvent. The electrolytic solution can be contained in the separator 6 before subjecting the same to the folding steps or after mounting the folded electrodes thereon.

In the secondary battery shown in FIG. 2, about 5/6 of the sheet-shaped positive electrode 4 folded in three is covered with the separator 6. In this laminated structure, there are five sides which are separated by the separator 6, and the positive electrode and the negative electrode are facing with each other, so that there are eleven electrode layers in total.

Figure 15:
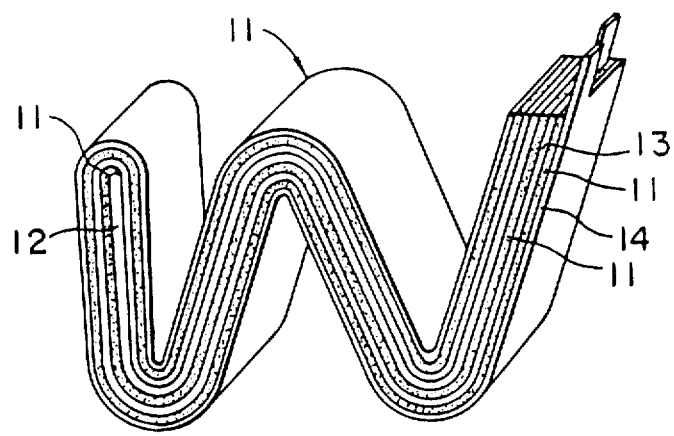
FIG. 15 is a diagram of a conventional folded battery.
Figure 16:
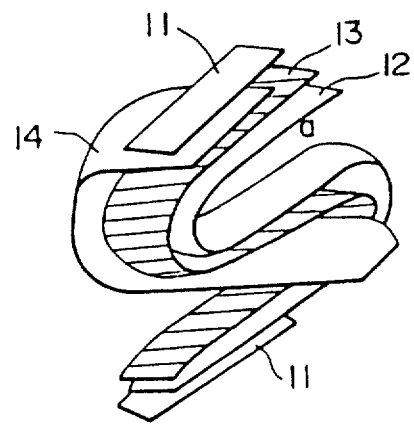
FIG. 16 is a diagram of the structure of the conventional folded battery.

FIGS. 15 and 16 are schematic illustrations showing a conventional thin type battery, in which reference numeral 11 indicates a collector whose only one side is covered with a sheet-shaped positive electrode 12. In this battery, a sheet-shaped negative electrode 14 and a separator 13 are incorporated in combination with the positive electrode 12. These figures are employed in order to show the advantage of the folded structure of the present invention. In FIG. 16, there are three faces which the positive electrode and the negative electrode are facing to each other, and ten electrode layers in total. The ratio of the faces which the positive electrode and the negative electrode are facing to each other to the total number of the laminated layers is smaller in the structure shown in FIG. 2 as compared with the structure of the conventional battery. Therefore, a thin type battery having a higher energy density can be obtained by applying the structure shown in FIG. 2. Further, comparing the lamination method shown in FIGS. 5 to 7 with the conventional one shown in FIG. 16, the structure shown in FIG. 2 is more effectively applicable to a collector. As shown in FIG. 5, only about 5/6 of the active material is covered with the separator. In the structure shown in FIG. 15, on the other hand, the active material is entirely covered with the separator. Therefore, the electrode having the structure shown in FIG. 2 becomes thinner and lighter in weight in comparison with the electrode having the structure shown in FIG. 15. The structure shown in FIG. 2 is thus superior to the conventional structure.

In FIG. 2, it is shown a sheet-shaped material folded in three, however, there is no limitation to the folding number for the battery of the present invention. The area of the sheet-shaped material which is covered with the separator can be adjusted in accordance with the folding number. In other words, the sheet-shaped material may be covered by the separator except one folded edge portion.

Figure 10:
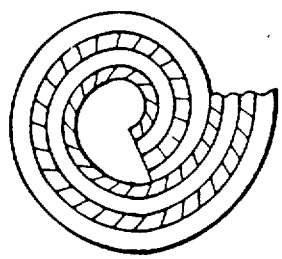
FIG. 10 is a diagram of a spiral cylinder type battery in which the laminated sheet shown in FIG. 9 is incorporated in the shape of a spiral cylinder.
Figure 12:
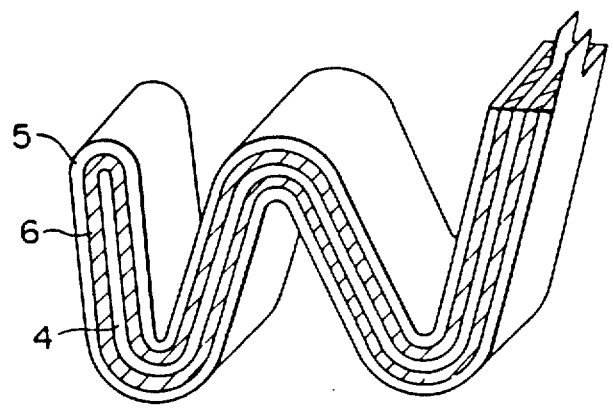
FIG. 12 is a diagram of a folded battery in which the laminated sheet shown in FIG. 11 is employed.

A spiral cylinder type battery shown in FIG. 10 can be mentioned as a second application example of a battery which is provided with an electrode containing a collector wherein both faces thereof are covered with a polymeric active material, and as a third application method, a folded battery shown in FIG. 12 can be mentioned.

Figure 11:
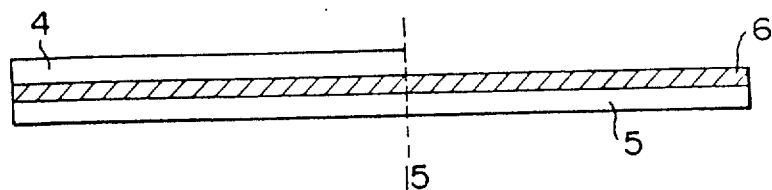
FIG. 11 is a diagram of a laminated sheet for use in a folded battery shown in FIG. 12.
Figure 13:
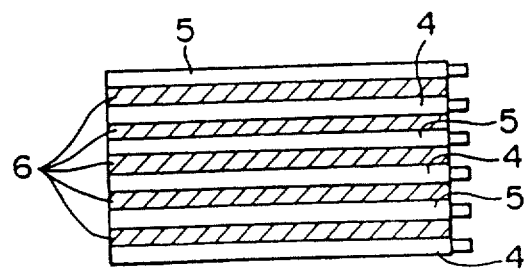
FIG. 13 is a diagram of an example of a laminated type battery.

As shown in FIG. 10, the separator 6, the sheet-shaped positive electrode 4, the separator 6 and sheet-shaped negative electrode 5 are alternately laminated in this order, followed by rolling them with the separator 6 positioned inside. FIG. 11 is a sectional view of a laminated sheet in which the sheet-shaped negative electrode 5, the separator 6, and the sheet-shaped positive electrode 4 which is half of the negative electrode 5 and the separator 6 in length are laminated. This sheet-shaped electrode is folded at a broken line 15, with the separator 6, the sheet-shaped electrode 5 and the folded sheet-shaped positive electrode 4 interposed therebetween, and further folded into an accordion shape as shown in FIG. 12. The structure shown in FIG. 13, in which the sheet-shaped positive electrode 4 and the sheet-shaped negative electrode 5 are alternatively superposed continuously by interposing the separator 6 therebetween, is also acceptable in order to obtain a battery having a high release voltage.

Figure 14:
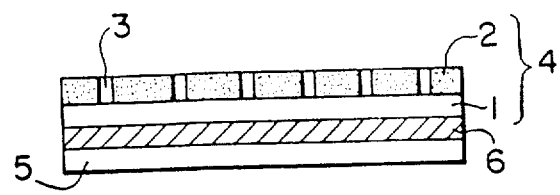
FIG. 14 is a diagram of an example of a thin type battery.

Further, a collector, provided with penetrating pores 3, whose only one face is covered with the polymeric active material can also be employed as an electrode to a thin type battery having high collecting efficiency and reliability. In this case, it is recommended to laminate, as shown in FIG. 14, the sheet-shaped positive electrode 4, the separator 6 and the negative electrode 5 in this order.

The elements of the secondary battery are explained in detail below.

The positive electrode of the secondary battery is an electrode which contains the collector and the polymeric active material of the present invention. As active materials for a negative electrode, conductive polymers, Li metal, Li-Al alloy, Li-Mg alloy, Li-Si alloy, and the like are usable. A sheet-shaped active material can be used singly as a negative electrode, however, in order to improve handling property and collecting efficiency, the sheet-shaped electrode of the present invention, the sheet-shaped collector having a rough surface, or a composite of the above described active material for the negative and the positive electrodes are preferably used as a negative electrode.

Nickel, aluminum and the like, which are the same material used for a positive electrode collector, are preferably used as a material for a negative electrode collector. Of these, aluminum is preferable in view of the weight. In order to prevent the formation of dentrite, an Al-Li alloy has been conventionally employed as a negative electrode. However, in the present invention, Al and Li can be separately used.

The active materials for the negative electrode may be formed on the negative electrode collector by vacuum deposition or by an electrochemical method, or by a mechanical method by sticking the collector to the active materials such as Li.

In the electrochemical method, an active material such as Li can be precipitated by using a positive electrode collector as an electrode. However, more preferably, an active material such as Li can be uniformly precipitated when electrolysis is conducted after covering the negative electrode collector with an ion conductive polymer. In this case, Li or the like can be deposited at the interface of the ion conductive polymer.

Regarding the method of sticking a collector and an active material with each other, a so-called sandwich structure in which the collector is interposed between the active material layers of the negative electrode can also be employed. Further, there can be employed such a structure that a collector having penetrating pores having a total surface area of 0.2 to 10 $cm^2$ and Li or Li alloy are stuck with each other in such a manner that the collector side can be used.

With respect to the thickness of the positive electrode, there is a wide range of choice, and about from about 3 to 300 μm, more preferably from about 10 to 200 μm, is suitable. In the case where the thickness is less than 3 μm, the self-supporting performance of the electrode decreases, so that it becomes to hard to handle it. On the contrary, when the thickness exceeds 300 μm, the electrode tends to lose flexibility.

The following anions and cations are used in combination as an electrolyte (dopant) of an electrolytic solution of the battery of the present invention. An n-type electroconductive polymer is obtained when a polymer complex is doped with cations, while p-type electroconductive polymer is obtained when a polymer complex is doped with anions. A p-type and an n-type semiconductors are used as a positive electrode and a negative electrode of the battery, respectively.

(i) Anions: halogenated anions of Va group elements such as $PF_6^-$, $SbF_6^-$, $AsF_6^-$ and $SbCl_6^-$; halogenated anions of IIIa group elements such as $BF_4^-$ and $BR_4^-$; and perchloric acid anions such as $ClO_4^-$.

(ii) Cations: alkali metal inos such as $Li^+$, $Na^+$ and $K^+$; and $(R_4N)^+$, in which R is a hydrocarbon group having 1 to 20 carbon atoms.

Examples of compounds capable of providing the above dopants include:

$LiPF_6$, $LiSbF_6$, $LiAsF_6$, $LiClO_4$, $NaClO_4$, KI, $KPF_6$, $KSbF_6$, $KAsF_6$, $KClO_4$, $[(n-Bu)_4N]^+ \cdot AsF_6^-$, $[(n-Bu)_4N]^+ \cdot ClO_4^-$, $LiAlCl_4$, $LiBF_4$, and the like.

As the solvents for an electrolytic solution of the battery, it is preferable to use non-protonic solvents having a large specific dielectric constant, which are referred to as polar non-protonic solvent. Examples of such solvents include: ketones, nitriles, esters, ethers, carbonates, nitro compounds, sulfolane compounds, and a mixture thereof. Of these, ethers, carbonates and sulfolane compounds are preferable. Typical examples of these solvents are ethylene carbonate, propylene carbonate, γ-butyrolactone, sulfolane, 3-methylsulfolane, 2-methyl tetrahydrofuran, dimethoxyethane and the like.

A separator prepared by using an electric insulating material, and having good resistance to chemicals, high mechanical stability, excellent flexibility, numerous fine pores and outstanding retentivity of an electrolytic solution is preferably used in the present invention. A conventional separator such as a glass fiber filter; a polymeric porefilter made of, for instance, nylon, polyester, Teflon, Polyflon, polypropylene, polyolefins and the like; and nonwoven fabrics made of glass fiber or the above polymers are employable. A sheet-shaped separator which has a thickness of 100 μm or less and is light in weight is preferred in view of the energy density.

Instead of the above described electrolytic solution and the separator, a solid electrolyte may be employed in the present invention, and, in case of need, it may be employed in combination with a separator and an electrolytic solution.

Examples of the inorganic solid electrolytes include: halogenated metals such as AgCl, AgBr, AgI and LiI; ceramics such as $RbAg_4I_5$, $RbAg_4I_4CN$, LiSiCON and NaSiCON; glass; and sheet-shaped composite solid electrolyte thin layers comprising a rubber-like elastic material. More preferable solid electrolytes are polymeric solid electrolyte.

A detailed explanation regarding the electrochemical polymerization method for preparing the polymeric active materials of the present invention will be given below. It is preferable to employ electrochemical polymerization in order to form the polymeric active material on the sheet-shaped collector, considering close contact between the active material and the collector. The electrochemical polymerization is superior to other methods because the active material and the collector can be directly and firmly contacted with each other without using any bonding agents.

The electrochemical polymerization method is disclosed in J. Electrochem. Soc., 130, No. 7, 1506–1509 (1983), Electrochem. Acta., 27, No. 1, 61–65 (1982) and J. Chem. Soc., Chem. Commun., 1199 (1984). According to this method, monomers and an electrolyte are dissolved in a solvent, and the resulting solution is placed in a prescribed electrolytic cell. Electrodes are immersed in this solution, followed by conducting electrochemical polymerization by means of anodic oxidation or cathodic reduction.

The monomers used in the above polymerization are preferably pyrrole, aniline, thiophen, benzene, triphenylamine, diphenylbenzidine, carbazol, and the derivatives thereof. However, it is not limited to the above monomers.

Preferable examples of the electrolyte used in the above method include anions such as $BF_4^-$, $AsF_6^-$, $SbF_6$, $PF_6^-$, $ClO_4^-$, $HSO_4^-$, $SO_4^{2-}$ and aromatic sulfonic anions; halogenated anions such as $Cl^-$, $Bi^-$ and $F^-$; and cations such as $H^+$, quaternary ammonium cations, $Li^+$, $Na^+$, and $K^+$. However, there is no specific limitation on the electrolyte.

Preferable examples of the solvent used in the above method include water, acetonitrile, benzonitrile, propylene carbonate, γ-butyloractone, dichloromethane, dioxane, dimethylhormamide, nitro solvents such as nitromethane, nitroethane, nitropropane and nitrobenzene. However, there is no specific limitation as to the solvent used.

The electrochemical polymerization satisfactorily proceeds when the monomer concentration is from about 0.001 to 2 mol/l, and preferably from 0.01 to 1 mol/l. In the case where the concentration is less than 0.001 mol/l, the reaction proceeds very slowly, and when it is more than 2 mol/l, the monomers are hardly dissolved.

Further, the concentration of the electrolyte is from about 0.01 to 5 mol/l, and preferably 0.1 to 3 mol/l. When the concentration is less than 0.01 mol/l, the polymerizing solution cannot possess the sufficient electroconductivity, and if it is more than 5 mol/l, a polymer film having a good quality cannot be obtained.

The above described collector of the present invention can be used, as it is, as a working electrode in this electrochemical polymerization.

As a counter electrode, metals such as Au, Pt and Ni; metal oxidation products such as $SnO_2$ and $In_2O_3$; and carbon are usable. In addition, an electrode made of a composite of the above materials and an electrode covered with then are also acceptable.

The electrochemical polymerization can be carried out by a constant-voltage electrolysis, a constant-electric current electrolysis or a constant-electric potential. Of these, a constant-electric current electrolysis and a constant-electric potential electrolysis are suitable, and the former electrolysis is more preferable in view of mass production.

Polyaniline is commonly synthesized in a reaction media containing protonic acid. Protonic acids usable for polymerization of aniline are hydrochloric acid, sulfuric acid, perchloric acid, borofluoric acid, methane sulfonic acid, trifluoroacetic acid, paratoluene sulfonic acid and the like.

Of these hydrochloric acid, sulfuric acid and borofluoric acid are preferable. This is because polyaniline which is synthesized in one of these solvents has low dissolving ability into a non-aqueous solvent.

It is desirable to add the protonic acid in such an amount that a pH of the electrolytic solution becomes 3 or less, preferably 2 or less. When the pH is more than 3, a growing rate of the polymer becomes slow, and the resulting polymer has a low polymerization degree. This is because the polymer is dissolved in a solvent such as dimethylhormamide in some degree. Further, the polymer cannot stand well for charging and discharging.

Aniline having a concentration of 0.001 to 2 mol/l, preferably 0.01 to 1.5 mol/l, is subjected to an anionidc oxidation, thereby obtaining an excellent polyaniline film. Any one of electrolysis such as a constant-electric current electrolysis, a constant-voltage electrolysis and a constant-electric potential electrolysis can be employed so long as an electrolytic potential of from 0.5 to 2.5 vs SCE is applied, and of these a constant-electric potential electrolysis is preferable.

The reaction temperature is in the range of from $-50°$ C. to $100°$ C., preferably $-30°$ C. to $50°$ C., and more preferably $0°$ C. to $20°$ C. It is necessary to determine the reaction time depending on the aimed amount of the polymer, the reaction temperature, the reaction system and the current density to be applied.

In the case where a composite of aluminum-aniline polymer compound is prepared by polymerizing aniline compound on an aluminum electrode by means of the electrochemical polymerization, it is necessary to employ sulfuric acid or sulfonic acids such as paratoluene sulfonic acid and benzene sulfonic acid as an electrolytic solution. The concentration of the aniline monomers in the reaction media is from 0.001 to 2 mol/l, preferably from 0.01 to 1 mol/l.

As described above, polyaniline is synthesized in various aqueous protonic acid solutions. If an aluminum electrode is used, the presence of an acid having a pKa of from $-2.5$ to $+2.5$ in the polymerization system is necessary. Such acids are, for instance, sulfonic acids such as paratoluene sulfonic acid, benzene sulfonic acid, and naphthalene sulfonic acid, and trifluroacetic acid. Of these, sulfuric acid and sulfonic acid are preferred. The acids other than these two are employed, the aluminum electrode is dissolved into the polymerization system as shown in the below described comparative example, so that good polymer film is not obtainable.

The amount of these acids, based on the acid concentration, is 0.5 mol/l or more, preferably from 1.0 to 6.0 mol/l, and more preferably 1.5 to 4.0 mol/l. When the molar ratio of the acid against the monomers falls within the range of from 3 to 10, a formation speed of polyaniline is high, and polyaniline having a high polymerization degree is uniformly and firmly deposited on an aluminum electrode.

Water is favorably used as a solvent. When water is employed, an aluminum electrode having a thickness of from 0.010 to 0.06 mm is preferably used. In the case where the constant-voltage electrolysis is employed, a positive electrode potential is determined in the range of from 0.5 to 2.5 V, preferably 0.7 to 0.95 V, against a saturated calomel relative electrode.

Details of the secondary battery containing the polymeric solid electrolyte, an outline of which has been given before, will be described below.

In the present invention, the following polymeric solid electrolytes can be employed: (1) gelatinous semi-solid electrolyte consisting of three components, a solvent, a polymer matrix, and an electrolytic salt; (2) two-component system consisting of a polymer matrix having an ion dissociated group and an electrolytic salt; and (3) a crosslinked polymeric solid electrolyte which is prepared by cross linking the above polymer matrix (2). Examples of the polymer matrices usable in the above (1) are polyalkyleneoxides such as polyethyleneoxide and polypropylene oxide; polyacrylonitrile and polyvinylidene fluoride. Examples of the polymer matrices usable in the above (2) and (3) are those having the following groups as the main or a side chain: $-(CH_2CH_2O)_n-$, $-(CH_2CH_2NH)_n-$,

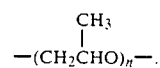

Of these, cross-linked polyethylene oxide of the above (3) has high mechanical strength and flexibility, so that it is suitable as a coating material for an electrode. Further, by adding a thermally fusible polymer such as polyacrylonitrile, polyethylene oxide, polyvinylidene fluoride and polyethylene imine to the polymer matrix of the above (3), an organic solid second battery having excellent interface adhesion can be effectively prepared by means of heating pressure method.

The electrolytic salts serving as a carrier in the polymeric solid electrolyte are combinations of anions such as $SCN^-$, $Cl^-$, $Br^-$, $I^-$, $BF_4^-$, $PF_6^-$, $AsF_6^-$, $ClO_4^-$, and $B(C_6H_5)_4^-$; alkali metal cations such as $Li^+$, $Na^+$, and $K^+$; and organic cations such as $(C_4H_9)_4N^+$ and $(C_2H_5)_4N^+$.

Solvents having a high boiling point (plasticizer), crown ether, and oligomers may be added to the above polymeric solid electrolytes (2) and (3) accordingly.

When compounds having a high boiling point and a high dielectric constant such as propylene carbonate, ethylene carbonate, dimethylhormamide and dimethylacetoamide are added to the electrolytic salts, the ion conductivity is remarkably increased to be almost same as that of the electrolytic solution. In the case where the composite electrode is used in a solvent medium or a semi-solid medium, the solid electrolyte is swollen by the above described compounds, so that the above compounds should be impregnated into the polymer before conducting lamination.

The above explained polymeric solid electrolyte is effectively utilizable when it is combined with aluminum.

The polymeric solid electrolyte can be laminated in accordance with one of the following manners: a manner in which the polymeric solid electrolyte is laminated on the composite of the collector-polymeric active material by dipping or casting; or the polymeric solid electrolyte is laminated on the collector by dipping or casting, followed by impregnating monomers and subjecting to electrochemical polymerization, thereby obtaining a composite in which the collector, the electrochemically polymerized film and the polymeric solid electrolyte are closely entangled. The electrode active material is grown to closely entangle with the polymeric solid electrolyte, so that the electrode active material and the polymeric solid electrolyte are closely contacted with each other, and redox reaction at the interface thereof is well proceeded. The thickness of the polymeric solid electrolyte is preferably 100 $\mu$m or less.

The thickness of the electrochemically polymerized film is adjustable by an amount of electric charges applied during the electrochemical polymerization.

Further, if the collector and the electrochemically polymerized film are closely contacted with each other, the polymeric solid electrolyte cannot come into therebetween, that is, no insulating layer is not formed upon laminating the electrolyte, and thus the battery finally obtained reveals the good properties.

The present invention will now be explained in greater detail with reference to the following Examples.

Collector Preparation Example 1 [Nickel]

Both faces of a nickel foil having a thickness of 10 $\mu$m were well roughened by using a cc 1000 cw sand paper. Thereafter, penetrating pores having a diameter of 400 $\mu$m were made with a distribution of 200 pores/cm$^2$ by using a needle, whereby Collector No. 1 was prepared.

Collector Preparation Example 2 [Nickel]

The procedure for preparing Collector No. 1 in Preparation Example 2 was repeated except that the process of roughening both faces of a nickel foil in Preparation Example 1 was omitted, whereby Collector No. 2 was prepared.

Collector Preparation Example 3 [Stainless steel]

Both faces of a stainless steel foil having a thickness of 10 $\mu$m were well roughened by ion spattering electrolytic etching. Thereafter, penetrating pores having a diameter of 400 $\mu$m were made with a distribution of 200 pores/cm$^2$ by a photolithography, whereby Collector No. 3 was prepared.

Collector Preparation Example 4 [Stainless steel]

The procedure for preparing Collector No. 3 in Preparation Example 3 was repeated except that the process for roughening the both faces of a stainless steel foil was omitted, whereby Collector No. 4 was prepared.

Collector Preparation Example 5 [Nickel]

In a sheet-shaped nickel having a thickness of 20 $\mu$m, a width of 40 mm and a length of 150 mm, round pores having a diameter of 100 $\mu$m with a distribution of 300 pores/cm$^2$, whereby Collector No. 5 was prepared.

The pores were provided in accordance with the following manner. A pattern of the pores was prepared on the surface of the nickel sheet by photolithography. Thereafter, a nickel sheet was subjected to a chemical etching treatment to form the pores therein.

Collector Preparation Example 6 [Nickel]

The procedure for preparing Collector No. 5 in Preparation Example 5 was repeated except that a sheet-shaped nickel having a thickness of 60 $\mu$m was used instead of the one having a thickness of 100 $\mu$m, whereby Collector No. 6 was prepared.

Collector Preparation Example 7 [Aluminum]

The procedure for preparing Collector No. 6 in Preparation Example 7 was repeated except that an aluminum foil 60 $\mu$m thick having a purity of 99.99% or more was used as a material for collector, whereby Collector No. 7 was prepared.

Collector Preparation Example 8 [Nickel]

Both faces of Collector No. 5 prepared in Preparation Example 5 were subjected to a blast treatment by using 200 mesh of emery SiC particles under a pressure of 1 kg, whereby Collector No. 8 was prepared.

Collector Preparation Example 9 [Nickel/polypyrrole]

The entire surface of Collector No. 8 in prepared in Preparation Example 8 was covered with a thin layer of polypyrrole, whereby Collector No. 9 was prepared.

The thin layer of polypyrrole was provided on Collector No. 8 in the following manner. Collector No. 8 was immersed in a 5% methanol solution of FeCl$_3$ for 3 minutes, and then air-dried. Thereafter, it was dipped into a 5% acetonitrile solution of pyrrole for 1 minute, followed by washing with acetonitrile and drying.

Collector Preparation Example 10

A nickel sheet having a thickness of 20 $\mu$m provided with pores having a diameter of 200 $\mu$m with a distribution of 200 pores/cm$^2$ was prepared by means of galvanization, followed by cutting into a sheet having a width of 5 cm and a length of 15 cm. Thereafter, the thus obtained nickel sheet was subjected to a blast treatment by using 100 mesh emery SiC particles under a pressure of 1 kg/cm$^2$, whereby Collector No. 10 was prepared.

Collector Preparation Example 11

An aluminum sheet of high purity having a thickness of 40 $\mu$m was subjected to photolithography and etching to provide pores having a diameter of 300 $\mu$m with a distribution of 100 pores/cm$^2$. The surface of the thus obtained porous sheet was roughened by applying thereto an alternating electric current of $\pm 3$ V with an electric field of 30 Hz in an aqueous solution which was a mixture of 1.5 N hydrochloric acid, 0.3 M oxalic acid and 0.3 M aluminum chloride, whereby Collector No. 11 was prepared.

Collector Preparation Example 12

A polyester film was punched so as to provide penetrating pores having a diameter of 400 $\mu$m with a distribution of 200 pores/cm$^2$. Thereafter, it was abraded by using an emery paper, followed by depositing aluminum by means of vacuum deposition, whereby Collector No. 12 was prepared.

Electrode Preparation Example 1

Figure 17:
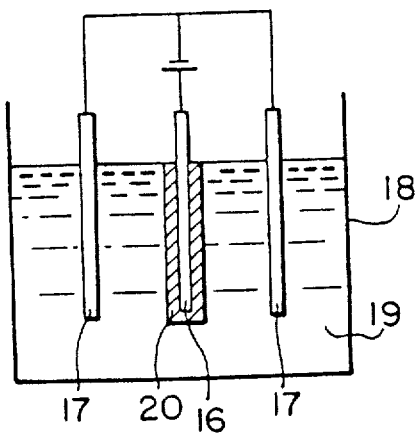
FIG. 17 is a diagram of a polymerization reactor apparatus for use in an example of the preparation of an electrode.

In accordance with the manner as shown in FIG. 17, an electrode for a battery was prepared. Specifically, positive electrode 16 made of Collector No. 1 and negative electrode 17 made of Ni were set in electrolytic cell 18, into which electrolytic solution 19 prepared by dissolving 0.1 mol of pyrrole and 0.05 M sodium paratoluene sulfonate into acetonitrile was placed. Thereafter, electrolysis was conducted by applying a constant voltage of 5 V to form a polypyrrole film as a polymeric active material film 20 on the both faces of Collector No. 1 so as to have a total thickness of 60 μm.

The thus obtained electrode was washed twice with acetonitrile and acetone, respectively, followed by subjecting the electrode to vacuum drying, whereby Electrode No. 1 was prepared. The collector and the polyprrole film of the thus obtained electrode were firmly contacted with each other, and no cracks or exfoliation were found in the polypyrrole film.

Electrode Preparation Example 2

The procedure for preparing Electrode No. 1 in Preparation Example 1 was repeated except that Collector No. 2 was used instead of Collector No. 1 as a positive electrode, whereby an electrode was prepared. It was confirmed that the collector and the polypyrrole film of the thus obtained electrode were firmly contacted with each other.

Electrode Preparation Example 3

In the same electrolytic cell as that used in Electrode Preparation Example 1, but equipped with Collector No. 3, instead of Collector No. 1, as a positive electrode, an electrolyte was placed, which was prepared by adding 0.05 mol of lutidine to a solution obtained by dissolving 4 mmol of diphenylbenzidine and 0.1 mol of ammonium perchloric tetrabutylate in acetonitrile. Thereafter, electrolysis was conducted by applying a constant voltage of 1.2 V vs SCE to form a film of diphenylbenzidine on both faces of the collector so as to totally be 50 μm of a thickness, followed by washing and drying in accordance with the same manner as in the preparation of Electrode No. 1, whereby an electrode was prepared. It was confirmed that the collector and the polydiphenylbenzidine film of the thus obtained electrode were firmly contacted with each other.

Electrode Preparation Example 4

The procedure in Electrode Preparation Example 3 was repeated except that Collector No. 4 was employed instead of Collector No.3 as a positive electrode, whereby an electrode was prepared. It was confirmed that the collector and the polydiphenylbenzidine film of the thus obtained electrode were firmly contacted with each other.

Electrode Preparation Example 5

In the same electrolytic cell as that used in Electrode Preparation Example 1, an electrolyte prepared by dissolving 0.2 mol of 3-methylthiophene and 0.1 mol of $LiBF_4$ into propylene carbonate was placed. Thereafter, electrolysis was conducted by applying a constant electric current of 10 mA/cm$^2$ to form a film of poly(3-methylthiophene) on both faces of the collector so as to have a total thickness of 60 μm, followed by washing and drying in the same manner as in Electrode Preparation Example 1, whereby an electrode was prepared. It was confirmed that the collector and the poly(3-methylthiophene) film of the thus obtained electrode were firmly contacted with each other.

Electrode Preparation Example 6

The same procedure as in Electrode Preparation Example 5 was repeated except that Collector No. 2 was used as a positive electrode, whereby an electrode was prepared. It was confirmed that the collector and the poly(3-methylthiophene) film were firmly contacted with each other.

Electrode Preparation Example 7

In the same electrolytic cell as that employed in Electrode Preparation Example 3, an electrolyte prepared by dissolving 1 mol of aniline and 2 mol of $HBF_4$ into distilled water was placed. Thereafter, electrolysis was conducted by applying a constant electric current of 20 mA/cm$^2$ to form a polyaniline film on both faces of the collector so as to have a total thickness of 60 μm, followed by washing and drying the same in the same manner as in Electrode Preparation Example 1, whereby an electrode was prepared. It was confirmed that the collector and the polyaniline of the thus obtained electrode were firmly contacted with each other.

Electrode Preparation Example 8

By using a polymerizing solution prepared by dissolving 0.5 M aniline and 5.5 N $H_2SO_4$ in water and Collector No. 5 as a working electrode, electrolysis was conducted by applying a constant electric potential of 0.75 V vs SCE to deposit a polyaniline film on both faces of the collector so as to have a total thickness of 20 μm, whereby a sheet-shaped positive electrode was prepared.

Electrode Preparation Example 9

By using a polymerizing solution prepared by dissolving 4.5 M N,N'-diphenylbenzidine, 0.1 M ammonium perchloric tetrabutylate and 0.05 M 2,6-lutidine in acetonitrile, Collector No. 6 as a working electrode, and a platinum counter electrode, electrolysis was conducted by applying a constant voltage of 1.2 V vs SCE to deposit a polymer of (N,N'-diphenylbenzidine), black in color, whereby an electrode was prepared. The thus obtained electrode was taken out of the electrolytic cell, and washed with acetonitrile. Thereafter, one surface of the electrode was scratched so as to have lattice-shaped scratches of 4 mm × 4 mm in size. An adhesive tape was applied to this scratched surface, and then peeled off in the direction parallel with the surface of the electrode at a rate of 60 mm/sec. The cohtact between the collector and the polymer was evaluated by counting the number of peeled off latice-shaped fragments of 4 mm × 4 mm in size. As a result, it was comfirmed that only three fragments peeled off the collector.

Electrode Preparation Example 10

Collector No. 7 was immersed in an aqueous solution containing 1.5 N $H_2SO_4$ and 0.5 M aniline, and electrolysis was conducted by applying a constant electric potential of 0.8 V vs SCE to deposite a polyaniline film on the collector, whereby an aluminum-polyaniline electrode was prepared. The thus obtained electrode was subjected to a folding test by folding the same at an angle of 90°. As a result, it was observed that the polyaniline film did not peel off the collector even after 50 times or more of the above folding.

Electrode Preparation Example 11

The same procedure as in Electrode Preparation Example 8 was repeated except that Collector No. 8 was used as a positive electrode, whereby an electrode was prepared.

Electrode Preparation Example 12

By using a polymerizing solution prepared by dissolving 0.5 M aniline and 1.0 M $HBF_4$ in water, and Collector No. 9 as a working electrode, electrolysis was conducted by applying a constant electric potential of 0.75 V vs SCE to deposit a polyaniline film on both faces of the collector so as to have a total thickness of 20 μm, whereby a sheet-shaped positive electrode was prepared.

Electrode Preparation Example 13

By using a polymerizing solution prepared by dissolving 0.1 M paratoluene sulfonic acid and 0.1 M pyrrole in acetonitrile, electrolysis was conducted by applying a constant electric potential of 4 V to deposit a polyprrole film having a thickness of 15 μm on both faces of Collector No. 10, whereby a sheet-shaped electrode was prepared.

Electrode Preparation Example 14

The same procedure for preparing the electrode in Electrode Preparation Example 8 was repeated except that Collector No. 11 was used as a positive electrode, whereby an electrode was prepared.

Electrode Preparation Example 15

A polymerizing solution was prepared by mixing 10 ml of benzene, 140 ml of nitrobenzene, a saturation amount of $LiAsF_6$ and a saturation amount of cadmium sulfate. The thus prepared solution was placed in a reaction vessel made of glass, and electrolysis was conducted under an Ar atmosphere by using Collector No. 12 as a working electrode. Upon conducting the electrolysis, a constant voltage of 15 V with an electric amount of 1.0 $C/cm^2$ was applied to form a polyphenilene film, black in color, on the collector, whereby an electrode was prepared. The thus prepared electrode was taken from the reaction vessel, followed by washing and drying the same. Thereafter, it was subjected to a folding test by using a MIT-type test apparatus. As a result, it was found that the electrode was not cloven even after 400 times or more of repeated folding.

Negative Electrode Preparation Example 1

One surface of a nickel foil having a thickness of 20 μm was well roughened by using a cc 100 cw sand paper. The thus roughened surface of the nickel foil and a lithium foil having a thickness of 50 μm were faced to each other and brought into pressure contact, whereby a negative electrode was prepared.

Negative Electrode Preparation Example 2

The procedure for preparing the negative electrode in Negative Electrode Example 2 was repeated except that the nickel foil was punched so as to provide pores having a diameter of 13 mm in a rate of 4000 $pores/cm^2$, whereby a negative electrode was prepared.

EXAMPLE 1

<Battery Preparation Example 1>

Figure 18:
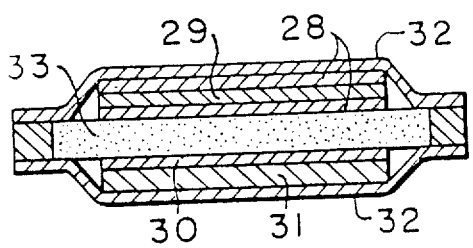
FIG. 18 is a diagram of battery shown in Example 1.
Figure 24:
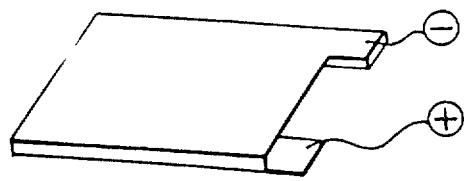

A thin type battery, Battery No. 1 as shown in FIG. 24, was prepared by using the electrode made in Electrode Example 1 as a positive electrode, Li as a negative electrode, and propylene carbonate containing 1 mol of $LiBF_4$ as an electrolyte. The thus prepared battery was subjected to a charging-discharging test. In FIG. 18, reference numeral 28 indicates a positive electrode active material, reference numeral 29 indicates a positive electrode collector, reference numeral 30 indicates a negative electrode active material, reference numeral 31 indicates a negative electrode collector, reference numeral 32 indicates an external cover, and reference numeral 33 indicates a separator.

EXAMPLE 2

<Battery Preparation Example 2>

The same charging-discharging test conducted as in Example 1 was repeated except that the electrode prepared in Electrode Preparation Example 2 was used as a positive electrode.

EXAMPLE 3

<Battery Preparation Example 3>

The procedure for preparing the battery in Example 1 was repeated except that the electrode prepared in Electrode Preparation Example 3 was used as a positive electrode, whereby a battery was prepared.

EXAMPLE 4

<Battery Preparation Example 4>

The same charging-discharging test conducted as in Example 1 was repeated except that the electrode prepared in Electrode Preparation Example 4 was used as a positive electrode.

EXAMPLE 5

<Battery Preparation Example 5>

The same charging-discharging test conducted as in Example 1 was repeated except that the electrode prepared in Electrode Preparation Example 5 and a Li-Al alloy (8:2) were used as a positive electrode and a negative electrode, respectively.

EXAMPLE 6

<Battery Preparation Example 6>

The same charging-discharging test conducted as in Example 1 was repeated except that the electrode prepared in Electrode Preparation Example 6 was used as a positive electrode.

EXAMPLE 7

<Battery Preparation Example 7>

The same charging-discharging test conducted as in Example 1 was repeated except that the electrode prepared in Electrode Preparation Example 7 was used as a positive electrode.

EXAMPLE 8

<Battery Preparation Example 8>

A thin type battery as shown in FIG. 2 was prepared by using the electrode prepared in Electrode Preparation Example 8 as a positive electrode, the electrode prepared in Electrode Preparation Example 2 as a negative electrode, a polypropylene pore filter as a separator, which had a maximum size of 0.02×0.2 μm to which a polypropylene nonwooven fabric was applied in order to improve the liquid retentivity, which is commercially available from Polyplastic Company, Ltd. under the trade mark of "Duragard" and has a thickness of 75 μm, was employed As an electrolyte, a solution prepared by dissolving 3 M $LiBF_4$ in a mixed solution of propylene carbonate and dimethoxyethane (1:1) was used. As an external cover, a four-layer laminated thermofusible composite material having a thickness of 100 μm was employed, which consisted of polyester, aluminum, nylon and polypropylene layers.

The electrolyte was injected into the battery after by using a syringe after the battery was fabricated. Thereafter, the peripheral portion of the battery was heated and pressed to seal the battery, whereby a battery having a size of 50 mm×50 mm×0.7 mm was prepared. The thus prepared battery was subjected to a charging-discharging test by applying a constant electric current of 1 mA.

EXAMPLE 9

<Battery Preparation Example 9>

Example 8 was repeated except that the electrode prepared in Electrode Preparation Example 9 was used as a positive electrode, whereby a battery was prepared. The performance of the thus prepared battery was evaluated.

EXAMPLE 10

<Battery Preparation Example 10>

Example 8 was repeated except that the electrode prepared in Electrode Preparation Example 10 was used as a positive electrode, whereby a battery was prepared. The performance of the thus prepared battery was evaluated.

EXAMPLE 11

<Battery Preparation Example 11>

Example 8 was repeated except that the electrode prepared in Electrode Preparation Example 11 was used as a positive electrode, whereby a battery was prepared. The performance of the thus prepared battery was evaluated.

EXAMPLE 12

<Battery Preparation Example 12>

Example 8 was repeated except that the electrode prepared in Electrode Preparation Example 12 was used as a positive electrode, whereby a battery was prepared. The performance of the thus prepared battery was evaluated.

EXAMPLE 13

<Battery Preparation Example 13>

Example 8 was repeated except that the electrode prepared in Electrode Preparation Example 13 was used as a positive electrode, whereby a battery was prepared. The performance of the thus prepared battery was evaluated.

EXAMPLE 14

<Battery Preparation Example 14>

Example 8 was repeated except that the electrode prepared in Electrode Preparation Example 14 was used as a positive electrode, whereby a battery was prepared. The performance of the thus prepared battery was evaluated.

EXAMPLE 15

<Battery Preparation Example 15>

Figure 19:
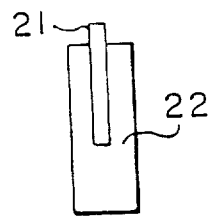
FIGS. 19 to 24 are diagrams of the structures of the thin type batteries in fabricated in Preparation Examples for Batteries Nos. 1 to 7, respectively.
Figure 22:
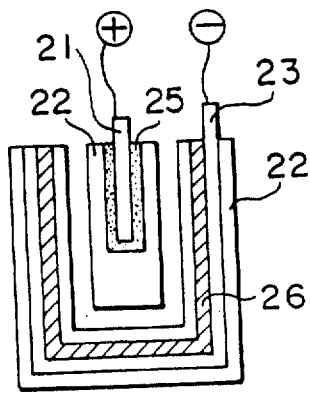
Figure 23:
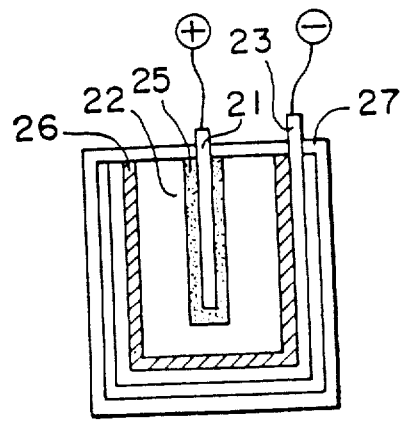

$LiBF_4$ was dissolved in 100 ml of propylene carbonate so that the concentration of LiBF was 1 mol/l. The mixture was heated to 80° C. to prepare a solution. 15 g of polyvinylidene fluoride was dissolved in the thus prepared solution, so that an electrolytic solution was obtained. A process after the above step will be explained with reference to FIGS. 19 to 23. Collector No. 6 (21) prepared in Collector Preparation Example 6 was immersed into a solution of a polymeric solid electrolyte (22), and a deposition amount of the electrolyte was adjusted so that the electrolyte film deposited on both faces of the collector was 45 μm each in a dry state (FIG. 19). Thereafter, nickel electrodes 23 were provided with application of pressure on both faces of the thus obtained composite of the collector and the polymeric solid electrolyte, followed by conducting electrolysis to form a polypyrrole film 25 with application of a constant electric current of 1 mA/cm², and blowing a pyrrole gas 24 (FIG. 20) against thereto, so that a positive electrode active material, that is, a polypyrrole 25, was caused to grow until it had a thickness of 16 μm. Then, a lithium foil 26 was caused to face the negative collector (nickel foil 23) prepared in Negative Electrode Preparation Example 1, and made integral with application of pressure thereto to prepare a negative electrode. The thus prepared negative electrode was covered with a polymeric solid electrolyte 22 with a thickness of 5 μm by the dipping method (FIG. 22). The above obtained positive electrode and negative electrode were layered as shown in FIG. 22, and brought into a thermal press at 100° C. The resulting composition was wrapped by a laminated layers of polyester, aluminum, nylon and uniaxial elongation polypropylene, followed by heating and presing, whereby Battery No. 15 (FIG. 23) was prepared. FIG. 24 is a perspective view of the thus obtained battery.

In the performance test of the batteries according to the present invention, the following items were evaluated: a release voltage, an energy capacity, a discharge capacity, a short-circuit current, and a cycle life of the battery.

EXAMPLE 16

<Battery Preparation Example 16>

Figure 20:
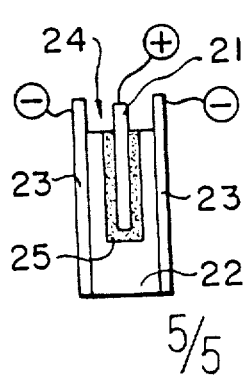
Figure 21:
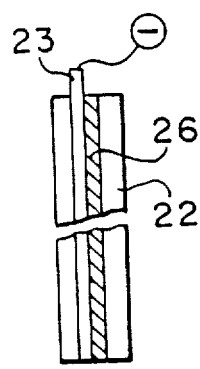

$LiBF_4$ was dissolved in 100 ml of propylene carbonate so that the $LiBF_4$ concentration was 1 mol/l. The mixture was heated to 80° C. to prepare a solution 15 g of polyvinylidene fluoride was dissolved in the thus obtained solution, so that an electrolytic solution was prepared. This electrolytic solution was casted onto Collector No. 7 to prepare a composite member of the collector and the solid electrolyte. Thereafter, nickel electrodes were provided with application of pressure thereto on both faces of the thus obtained composite member, and electrolysis was conducted with application of a constant electric current of 1 mA/cm$^2$ with blowing a pyrrole gas against thereto to form a polyprrole film serving as a positive electrode active material, until it had a thickness of 16 μm, whereby a composite member of a solid electrolyte (3 cm×3 cm), a nickel collector and polypyrrole (FIG. 20). Apart from the above, a composite member of a solid electrolyte, a nickel collector and lithium (FIG. 21) was prepared in the same manner as in Example 15. These two composite members were layered, and brought into thermal press at 100° C. (FIGS. 22 and 23), so that a battery was finally prepared in the same manner as in Example 15. The life of the thus prepared battery was evaluated.

EXAMPLE 17

<Battery Preparation Example 17>

Collector No. 10 prepared in Collector Preparation Example 10 was immersed into an aqueous solution containing 3.5 N H$_2$SO$_4$ and 0.5 M aniline, and electrolysis was conducted with application of a constant electric current of 2 mA/cm$^2$ to form polyaniline film having a thickness of 16 μm on a aluminum foil. In the above, the amount of applied electric quantity was 0.08 C/cm$^2$. Thereafter, a polymeric solid electrolyte was cast on the above obtained composite member of aluminum and polyaniline, so that a composite member of aluminum, polyaniline and a polymeric solid electrolyte was obtained. The polymeric solid electrolyte was formed in the following manner.

Tolylene ±2.4-diisocyanate was dissolved in polyethylene oxidotriol having three functional groups (MW 3066) so that the ratio of the functional groups was 1:1, followed by incorporation of 10 wt. % of propylene carbonate and LiBF in a rate of 0.02 mol per one unit of ethylene oxide. The resulting solution was cast on the above-obtained aluminum-polyaniline layer, and a cross linking reaction was conducted at 80° C. for 72 hours, whereby a battery was prepared in the same manner as in Battery Preparation Example 15, and the performance of the battery was evaluated.

COMPARATIVE EXAMPLE 1

The same procedure for preparing the electrode as in Electrode Preparation Example 1 was repeated except that a commercially available nickel foil having a thickness of 10 μm was used as a collector, whereby a comparative electrode was prepared. It was observed that the polypyrrole film partially came up from the collector when the electrode was subjected to repeated washing and drying. A charging-discharging test carried out in the same manner as in Example 1 except that the above obtained electrode was used as a positive electrode.

COMPARATIVE EXAMPLE 2

The same procedure for preparing the electrode as in Electrode Preparation Example 3 was repeated except that a commercially available stanless steel foil having a thickness of 10 μm was used as a collector, whereby a comparative electrode was prepared. It was observed that the polydiphenyl benzidine film partially cracked and came up from the collector when the electrode was subjected to repeated washing and drying. A charging-discharging test carried out in the same manner as in Example 1 except that the above obtained electrode was used as a positive electrode.

COMPARATIVE EXAMPLE 3

The same procedure for preparing the electrode as in Electrode Preparation Example 7 was repeated except that a commercially available stainless steel foil having a thickness of 10 μm was used as a collector, whereby a comparative electrode was prepared. It was observed that the polyaniline film partially peeled off the collector when the electrode was subjected to repeated washing and drying, whereby a comparative electrode was prepared. A charging-discharging test carried out in the same manner as in Example 1 was repeated except that the above-obtained electrode was used as a positive electrode.

COMPARATIVE EXAMPLE 4

The same procedure for preparing the electrode as in Electrode Preparation Example 9 was repeated except that an aluminum foil having a thickness of 30 μm was used as a collector, so that a polymer was deposited on the aluminum foil, whereby a comparative electrode was prepared. The thus obtained electrode was subjected to a close contact test in order to evaluate the contact between the collector and the electroconductive polymer deposited on the collector. As a result, it was found that the polymer peeled off at 13 portions. Further, a comparative battery was prepared in the same method as described before, and the performance of the battery was evaluated.

COMPARATIVE EXAMPLE 5

The same procedure for preparing the electrode as in Electrode Preparation Example 10 was repeated except that an aluminum foil having a thickness of 3 μm was used as a collector, whereby a comparative electrode was prepared. The thus prepared electrode was subjected to a folding test. As a result, it was found that after 5 of foldings, cracking began to appear on the polyaniline film, and after 34 times of folding, ⅓ of the polyaniline film was cracked, and the polyaniline film partially peeled off the collector. Further, a battery was prepared in the same manner as previously described, and the performance of the battery was evaluated.

COMPARATIVE EXAMPLE 6

The same procedure for preparing the electrode as in Electrode Preparation Example 11 was repeated except that a nickel foil having a thickness of 30 μm was used as a collector, whereby a comparative electrode was prepared. By using the thus prepared electrode, a comparative battery was prepared in the same manner as described before. The performance of the battery was evaluated.

COMPARATIVE EXAMPLE 7

The same procedure for preparing the battery as in Battery Preparation Example 16 was repeated except that a nickel foil having a thickness of 10 μm was used as a collector, whereby a comparative battery was prepared. The performance of the thus prepared battery was evaluated.

TABLE 1

(Results of Charging-Discharging Test)
(Batteries Nos. 1-7)

| Battery | | No. 1 | No. 2 | Comparative Example 1 | No. 3 | No. 4 | Comparative Example 2 | No. 5 | No. 6 | No. 7 | Comparative Example 3 |
|---|---|---|---|---|---|---|---|---|---|---|---|
| Structure Material | Positive Electrode Active Material | Polypyrrole | Polypyrrole | Polypyrrole | Polydiphenyl-benzidine | Polydiphenyl-benzidine | Polydiphenyl-benzidine | Poly(3-methyl-thiophene) | Poly(3-methyl-thiophene) | Polyaniline | Polyaniline |
| | Collector (No.) | Ni foil (penetrating pores, rough surface) (1) | Ni foil (penetrating pores, rough surface) (2) | Ni foil | Stainless steel foil (penetrating pores, rough surface) (3) | Stainless steel foil (penetrating pores, rough surface) (4) | Stainless steel foil | Ni foil (penetrating pores, rough surface) (5) | Ni foil (penetrating pores) (6) | Stainless steel foil (penetrating pores, rough surface) (7) | Stainless steel foil |
| | Negative Electrode Active Material | Li | Li | Li | Li | Li | Li | Li-Al alloy (8:2) | Li-Al alloy (8:2) | Li-Al alloy (8:2) | Li-Al alloy (8:2) |
| Results of Charging-Discharging Test | Released Voltage (V) | 3.6 | 3.6 | 3.6 | 3.9 | 3.9 | 3.7 | 3.5 | 3.5 | 3.7 | 3.7 |
| | Capacity of Initial Discharge (Ah/Kg) | 77 | 78 | 69 | 96 | 100 | 66 | 95 | 95 | 117 | 72 |
| | Energy Density After Conducting 10 cycles of Charging-Discharging (Wh/Kg) | 77 | 75 | 21 | 97 | 98 | 14 | 94 | 95 | 115 | 28 |
| | Initial Energy Density (Wh/Kg) | 270 | 268 | 242 | 301 | 305 | 198 | 312 | 315 | 326 | 259 |
| | Energy Density after Conducting 10 cycles of Charging-Discharging (Wh/Kg) | 268 | 266 | 76 | 306 | 305 | 51 | 309 | 312 | 326 | 103 |
| | Life Determined by a Repeated Charging-Discharging Test (times) | more than 100 times | more than 100 times | 29 times | more than 100 times | more than 100 times | 11 times | more than 100 times | more than 100 times | more than 100 times | 27 times |
| | Short Circuit Current (mA/cm$^2$) | 4.1 | 3.7 | 2.6 | 4.1 | 3.8 | 2.5 | 4.8 | 4.3 | 3.7 | 2.3 |

TABLE 2

(Evaluation Results of Performance of Battery)
(Batteries Nos. 8-14)

| Battery | No. 8 | No. 9 | Comparative Example 4 | No. 10 | Comparative Example 5 | No. 11 | Comparative Example 6 | No. 12 | No. 13 | No. 14 |
|---|---|---|---|---|---|---|---|---|---|---|
| Positive Electrode | Polianiline | Poly- | Polydiphenyl | Polianiline | Polyaniline | Polyaniline | Polyaniline | Poly- | Poly- | Poly- |

TABLE 2-continued (Evaluation Results of Performance of Battery)
(Batteries Nos. 8-14)

| Battery | | No. 8 | No. 9 | Comparative Example 4 | No. 10 | Comparative Example 5 | No. 11 | Comparative Example 6 | No. 12 | No. 13 | No. 14 |
|---|---|---|---|---|---|---|---|---|---|---|---|
| Active Material | | line | diphenyl benzidine | benzidine | | | | | aniline | pyrrole | aniline |
| Negative Electrode Collector No. | | Ni (5) | Al (6) | Al | Al (7) | Al | Ni (8) | Ni | Ni/pyrrole (9) | Ni (10) | Al (11) |
| 5th Cycle | Capacity of Discharge (mAh) | 6 | 4.5 | 4.8 | 6.0 | 5.5 | 6.2 | 6.5 | 6.5 | 4.7 | 6.3 |
| | Short Circuit Current (mA) | 7.5 | 3.6 | 3.1 | 6.1 | 5 | 8.1 | 5.3 | 6.5 | 8.0 | 6.8 |
| 50th Cycle | Capacity of Discharge (mAh) | 6.8 | 4 | 0 | 6.2 | 3.2 | 7.5 | 0.5 | 7.5 | 4.5 | 6.3 |
| | Short Circuit Current (mA) | 7.5 | 3.6 | — | 6.5 | 4.1 | 8.1 | 1.5 | 6.6 | 7.7 | 7.0 |

TABLE 3

(Evaluation Results of Performance of Battery)
(Batteries Nos. 15-17)

| Battery | No. 15 | No. 16 | No. 17 | Comparative Example 7 |
|---|---|---|---|---|
| Released Voltage (V) | 3.3 | 3.3 | 3.3 | 3.3 |
| Capacity of Energy (mWh) | 2.8 | 2.8 | 2.6 | 2.5 |
| Capacity of Discharge (mAh) | 0.97 | 0.98 | 0.94 | 0.89 |
| Short Circuit Current (mA/cm²) | 2.6 | 2.6 | 2.4 | 1.6 |
| Life Determined by a Repeated Charging-Discharging Test | more than 100 times | more than 100 times | more than 100 times | 28 times |

INDUSTRIAL UTILIZATION

As can be clearly seen from the above explanation, the penetrating pores provided on a collector remarkably enlarges the contact area between the collector and a polymer material. This structure of the present invention thus brings about close contact between the collector and the polymer material. Consequently, a battery containing the collector of the present invention as an electrode has a low inner impedance, leading to a large short-circuit current. In addition, since a battery of this type hardly undergoes chemical destruction, it has a prolonged life. The penetrating pores also enlarge the area which retains an active material, so that the layer of the polymeric material can be made considerably thinner than the conventional one, and close, firm contact between the collector and the polymeric material can be achieved. Thus, an electrode which has high reliability and a prolonged life is obtainable by employing the collector of the present invention. Further, by utilizing such an electrode, a small but high-powered thin battery having a prolonged life can be obtained.

What is claimed is:

1. A sheet-shaped electrode, comprising:
   a polymeric active material; and
   a collector, wherein said collector is in the shape of a sheet and has a plurality of penetrating pores of a round shape over the surface thereof and wherein a layer of said polymeric active material is formed on opposing faces of said sheet of said collector.

2. The sheet-shaped electrode as claimed in claim 1, wherein said collector has a rough surface.

3. A secondary battery which comprises:
   a sheet-shaped electrode which includes a polymeric active material and a collector, wherein said collector is in the shape of a sheet and has a plurality of penetrating pores over the surface thereof and wherein a layer of polymeric active material is formed on opposing faces of said sheet of said collector and wherein said electrode comprises a positive electrode;
   a negative electrode; and
   a separator wherein said positive electrode, said separator and said negative electrode are in the form of a sheet and are folded alternately with said separator interposed therebetween.

4. A secondary battery as claimed in claim 3, wherein said collector has a rough surface.

5. A secondary battery, comprising:
   a positive electrode;
   a separator; and
   a negative electrode wherein said positive electrode, said separator and said negative electrode are each in the shape of a sheet, said positive electrode and said negative electrode are folded alternatively with said separator interposed therebetween and terminals of both electrodes of a collector are positioned at end portions of said positive and said negative electrodes, said end portions of said positive and negative electrodes facing one another, wherein said positive electrode comprises a polymeric active material and said collector, said collector being in the shape of a sheet and having a plurality of penetrating pores over the surface thereof and wherein a layer of polymeric active material is formed on opposing faces of said sheet of said collector.

6. A secondary battery as claimed in claim 5, wherein said collector has a rough surface.

7. A secondary battery, comprising:
 a positive electrode;
 a solid electrolyte; and
 a negative electrode wherein said positive electrode comprises a sheet-shaped electrode and wherein said solid electrolyte comprises a polymeric active material and a collector, said collector being in the shape of a sheet and having a plurality of penetrating pores formed over the surface thereof and wherein a layer of polymeric active material is formed on opposing faces of said sheet of said collector; and
 a separator wherein said positive electrode, said separator and said negative electrode are each in the form of a sheet and said positive and negative electrode are alternately folded with said separator interposed therebetween.

8. A secondary battery as claimed in claim 7, wherein said collector has a rough surface.

9. A method for preparing a sheet-shaped electrode, which comprises:
 forming a collector in the form of a sheet having a plurality of penetrating holes of a round shape formed over the surface thereof and forming a layer of polymeric active material on opposing faces of said sheet of said collector wherein said collector comprises aluminum and wherein said polymeric active material comprises a polyaniline material; and
 electrochemically polymerizing said polyaniline material in the presence of sulfuric acid.

* * * * *

UNITED STATES PATENT AND TRADEMARK OFFICE
CERTIFICATE OF CORRECTION

PATENT NO. : 4,999,263

DATED : March 12, 1991

INVENTOR(S) : Toshiyuki Kabata, et al

It is certified that error appears in the above-identified patent and that said Letters Patent is hereby corrected as shown below:

The title page showing the illustrative figure should be deleted to appear as per attached title page.

The sheets of drawings should be deleted to be replaced with the 5 sheets of drawings as shown on the attached sheets.

Signed and Sealed this

Fifth Day of November, 1991

*Attest:*

HARRY F. MANBECK, JR.

*Attesting Officer*  *Commissioner of Patents and Trademarks*

United States Patent [19]

Kabata et al.

[11] Patent Number: 4,999,263
[45] Date of Patent: Mar. 12, 1991

[54] SHEET-SHAPED ELECTRODE, METHOD OR PRODUCING THE SAME, AND SECONDARY BATTERY

[75] Inventors: Toshiyuki Kabata, Yokohama; Toshiyuki Ohsawa, Kawasaki; Sachiko Yoneyama, Yokohama; Okitoshi Kimura, Tokyo, all of Japan

[73] Assignee: Ricoh Company, Ltd., Tokyo, Japan

[21] Appl. No.: 290,411

[22] PCT Filed: Apr. 14, 1988

[86] PCT No.: PCT/JP88/00373
§ 371 Date: Dec. 15, 1988
§ 102(e) Date: Dec. 15, 1988

[87] PCT Pub. No.: WO88/08210
PCT Pub. Date: Oct. 20, 1988

[30] Foreign Application Priority Data

Apr. 15, 1987 [JP] Japan .................. 62-92791
Jul. 6, 1987 [JP] Japan .................. 62-168280
Jul. 9, 1987 [JP] Japan .................. 62-169689
Oct. 2, 1987 [JP] Japan .................. 62-248093
Nov. 11, 1987 [JP] Japan .................. 62-283095

[51] Int. Cl.⁵ .................. H01M 4/60; H01M 4/70
[52] U.S. Cl. .................. 429/131; 29/623.1; 429/213
[58] Field of Search .......... 429/212, 213, 191, 241, 429/94, 131, 136; 29/623.3, 623.1

[56] References Cited

U.S. PATENT DOCUMENTS

| | | | |
|---|---|---|---|
| 3,350,239 | 10/1967 | Stanimirovitch | 29/623.3 |
| 3,530,001 | 9/1970 | Harivel | 429/94 |
| 4,189,533 | 2/1980 | Sugalski | 429/241 |
| 4,717,634 | 1/1988 | Daifuku et al. | 429/194 |
| 4,731,311 | 3/1988 | Suzuki et al. | 429/213 |
| 4,824,745 | 4/1989 | Ogawa et al. | 429/213 |
| 4,879,192 | 11/1989 | Nishimura et al. | 429/213 |

Primary Examiner—Donald L. Walton
Attorney, Agent, or Firm—Oblon, Spivak, McClelland, Maier & Neustadt

[57] ABSTRACT

A sheet-shaped electrode comprising a polymeric active material (1) and a collector (2) having a plurality of penetrating pores (3), a method of producing the same, and a secondary battery containing the sheet-shaped electrode as a positive electrode. The plurality of the pores provided on the sheet-shaped collector enlarges the contact area between the collector and the polymeric active material, so that close contact between these two members is improved. A polyaniline layer which is prepared by electrochemical polymerization of an aniline type compound in the presence of sulfuric acid or sulfonic acids is applied on both faces of the collector (aluminum) as the polymeric active material. In a secondary battery which comprises the sheet-shaped electrode as a positive electrode, the positive and a negative electrodes are alternately folded with a separator interposed therebetween. Terminals for both electrodes of the collector are arranged at the opposite end portions of the positive electrode and the negative electrode, respectively.

9 Claims, 12 Drawing Sheets

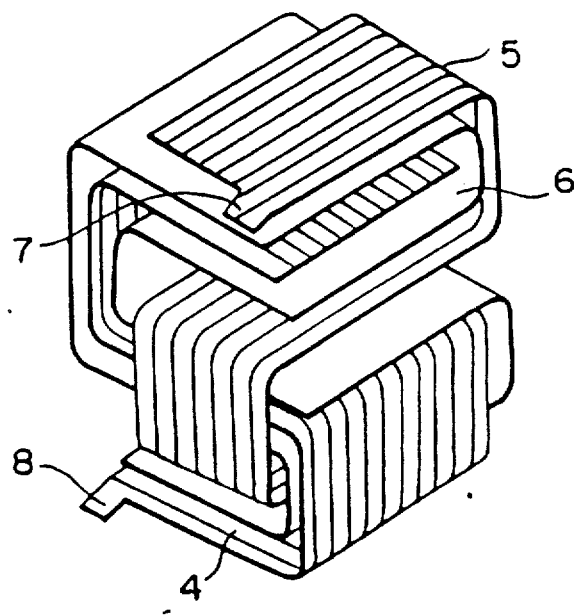

UNITED STATES PATENT AND TRADEMARK OFFICE
CERTIFICATE OF CORRECTION

PATENT NO. : 4,999,263

DATED : March 12, 1991

INVENTOR(S) : Toshiyuki Kabata, et al

It is certified that error appears in the above-indentified patent and that said Letters Patent is hereby corrected as shown below:

In column 2, line 27, delete "above described" and insert --above-described--;

In column 3, line 32, delete "above mentioned" and insert --above-mentioned--;

In column 3, line 41, delete "maximum amount an amount" and insert --maximum amount, an amount--;

In column 4, line 12, delete "above described" and insert --above-described--;

In column 4, line 56, delete "above described" and insert --above-described--;

In column 6, line 61, delete "batteries in fabricated" and insert --batteries fabricated in--;

In column 8, line 26, delete "folded in folds" and insert --folded in three folds--;

In column 8, line 60, delete "remaining one edge" and insert --one remaining edge--;

UNITED STATES PATENT AND TRADEMARK OFFICE
CERTIFICATE OF CORRECTION

PATENT NO. : 4,999,263
DATED : March 12, 1991
INVENTOR(S) : Toshiyuki Kabata, et al It is certified that error appears in the above-indentified patent and that said Letters Patent is hereby corrected as shown below:

In column 10, line 49, delete "above described" and insert --above-described--;

In column 11, line 35, delete "metal inos" and insert --metal ions--;

In column 11, line 67, delete "above described" and insert --above-described--;

In column 12, line 64, delete "above described" and insert --above-described--;

In column 13, line 3, delete "with then" and insert --with them--;

In column 13, line 17, delete "Of these hydrochloric" and insert --Of these, hydrochloric--;

In column 13, line 31, delete "an anionide" and insert --an anionic--;

In column 14, line 22, delete "crosslinked" and insert --cross-linked--;

UNITED STATES PATENT AND TRADEMARK OFFICE
CERTIFICATE OF CORRECTION

PATENT NO. : 4,999,263
DATED : March 12, 1991
INVENTOR(S) : Toshiyuki Kabata, et al It is certified that error appears in the above-indentified patent and that said Letters Patent is hereby corrected as shown below:

In column 14, line 23, delete "crosslinked" and insert --cross-linked--;

In column 14, line 60, delete "same" and insert --the same--;

In column 14, line 63, delete "above described" and insert --above-described--;

In column 16, line 23, delete "in prepared" and insert --prepared in--;

In column 17, line 38, delete "totally be 50 um of a thickness" and insert --have a total thickness of 50um--;

In column 21, line 5, delete "nonwoven" and insert --non-woven--;

In column 22, line 46, delete "presing" and insert --pressing--;

In column 23, line 24, delete "a" and insert --an--;

In column 23, line 40, delete "crosslinking" and insert --cross-linking--;

UNITED STATES PATENT AND TRADEMARK OFFICE
CERTIFICATE OF CORRECTION

PATENT NO. : 4,999,263
DATED : March 12, 1991
INVENTOR(S) : Toshiyuki Kabata, et al It is certified that error appears in the above-indentified patent and that said Letters Patent is hereby corrected as shown below:

In column 23, line 62, delete "stanless" and insert --stainless--.

Signed and Sealed this

Third Day of May, 1994

Attest:

BRUCE LEHMAN

*Attesting Officer*

Commissioner of Patents and Trademarks